(12) United States Patent
Olsson

(10) Patent No.: US 8,135,661 B2
(45) Date of Patent: Mar. 13, 2012

(54) ELECTRONIC SYSTEM WITH METHODS FOR EARLY DETECTION AND PREDICTION OF EXTERNAL FORCES' HARMFUL INTENTIONS

(76) Inventor: Kjell Olsson, Järfälla (SE)

( * ) Notice: Subject to any disclaimer, the term of this patent is extended or adjusted under 35 U.S.C. 154(b) by 775 days.

(21) Appl. No.: 10/593,273

(22) PCT Filed: Mar. 14, 2005

(86) PCT No.: PCT/SE2005/000358
§ 371 (c)(1),
(2), (4) Date: Sep. 18, 2006

(87) PCT Pub. No.: WO2005/088505
PCT Pub. Date: Sep. 22, 2005

(65) Prior Publication Data
US 2007/0255672 A1    Nov. 1, 2007

(30) Foreign Application Priority Data

Mar. 16, 2004   (SE) ..................................... 0400663

(51) Int. Cl.
G06F 17/00  (2006.01)
G06N 7/00   (2006.01)
G06N 7/08   (2006.01)
(52) U.S. Cl. ........................................................ 706/56
(58) Field of Classification Search ....................... 706/56
See application file for complete search history.

(56) References Cited

U.S. PATENT DOCUMENTS 6,304,833 B1   10/2001   Ferkinhoff et al.
7,308,388 B2 *  12/2007   Beverina et al. .................. 703/6

OTHER PUBLICATIONS

Musman, S. & Chang, L. "Why do now what can be done later", in Proceedings of Spatial-Temporal reasoning workshop IJCAI, 1995, pp. 191-198.*
Musman, S. & Chang, L. "A case study of scaling problems in ship classification", NRL/MR/5513-93-7388.*
Musman, S., Chang, L. & Booker, L. "Application of a real-time control strategy for Bayesian belief networks to ship classification problem solving," Intl. J. Pattern Recognition and Artificial Intelligence, vol. 7, No. 2, (1993) 513-525.*
Heckerman, D., Geiger, D. & Chickering, D. Learning Bayesian Networks: The Combination of Knowledge and Statis.*
Shin et al. "Performance Prediction of a Network-Centric Warfare System", 2000, number of pp. 14, public release URL http://www.dodccrp.org/events/2000_CCRTS/html/pdf_papers/Track_2/048.pdf.*
MacMillan, J. et al. Designing the Best Team for the Task: Optimal Organizational Structures for Military Missions. In Mike McNeese, Ed Salas, and Mica Endsley (editors), New Trends in Cooperative Activities: System Dynamics in Complex Settings. San Diego, CA: Human Factors and Ergonomics Society Press, 2002, number pf pp. 23.*
Shin et al. "Performance Prediction of a Network-Centric Warfare System", 2000, number of pp. 14.*

(Continued)

*Primary Examiner* — Alan Chen
*Assistant Examiner* — Li-Wu Chang

(57) ABSTRACT

A method and an arrangement in electronic systems. Uncertainties are handled in a special way. The uncertainties can regard a parameter that is to be determined or uncertainties in signals or data that constitute a basis for determination of the sought parameter. There is often also a time-critically within the application. In certain applications, changes can be rapid and the invention can also handle such dynamic processes. Detection and prediction in electronic systems are carried out.

27 Claims, 11 Drawing Sheets

OTHER PUBLICATIONS

Allanach et al. Detecting, Tracking and Counteracting Terrorist Networks via Hidden Markov Models, IEEE Aerospace Conference, Big Sky MT, Mar. 13, 2004, pp. 12.*

Wagenhals et al. "Modeling Support of Effects-Based Operations in War Games", (Tracks: #4 C2 Decisionmaking & Cognitive Analysis, pp. 16.*

Angela M. Pawlowski et al.; Situation and Threat Refinement Approach for Combating the Aysmmetric MSS NSSDF Conference, San Diego, CA, Aug. 2002; pp. 1-12; Chapters 4.21, 4.2.2, 4.4.1-4.4.5.

Robert Suzić; Representation and Recognition of Uncertain Enemy Policies Using Statistical Models; Proceedings of the NATO RTO Symposium on Military Data and Information Fusion, Prague, Czech Republic, Oct. 2003, ; pp. 1-19' Chapter 2.3 and 3.

* cited by examiner

ELECTRONIC SYSTEM WITH METHODS FOR EARLY DETECTION AND PREDICTION OF EXTERNAL FORCES' HARMFUL INTENTIONS

CROSS REFERENCE TO RELATED APPLICATIONS

This application claims priority to Swedish patent application 0400663-1 filed on Mar. 16, 2004 and is the national phase under 35 U.S.C. §371 of PCT/SE2005/000358.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention relates to a method and arrangement in an electronic system. The application can concern smaller systems for control, monitoring and regulation, and can also concern larger systems, such as, for example, systems for police, fire services, rescue services, etc. The application can also relate to a subsystem or a function in a very large system, for example comprised in management systems for military operations.

The invention is characterized in that it handles uncertainties within its area of application in a special way. These can be uncertainties regarding the parameter that is to be determined or uncertainties in the signals or data that constitute the basis for the determination of the sought parameter. There is often also a time-criticality within the application. In certain applications, changes can be rapid, and the invention can also handle such dynamic processes. The benefit of the invention is particularly marked in the difficult cases when these dynamic processes are associated with uncertainties.

Social development is leading to "complexity" increasing in society. It is becoming more difficult to evaluate situations. It is becoming more and more difficult to make decisions and choose between different alternatives. The uncertainty seems to be increasing. In many cases, complete information is not available. There are only probabilities for different alternatives. Probabilities can be calculated. However, people find it difficult to evaluate probabilities, even in simple cases.

Therefore people find it difficult to handle uncertainties well. There is a great need for technical solutions that assist people, in areas where people are weak.

In the business world, many decisions are taken with great uncertainty. Technical information systems and management support systems for decision-makers are available, but technical support has not been developed to handle uncertainties.

The reason for this is the technical problems in achieving solutions. A common problem for those researching in the area or attempting to develop solutions is that the number of possibilities is often unmanageably large. There are also problems with the information being based on different concepts, that is quantities that are not directly comparable.

The invention avoids difficulties that arise in the above-mentioned traditional perspectives. The invention is a method that solves the technical methodological problems and thereby creates a technically feasible method.

| A person | The technical solution according to the invention |
|---|---|
| 1. Finds it difficult to deal with uncertainties: Is poor at evaluating probabilities. | 1. Uses technical solutions and methods for dealing with uncertainties: Probability measures for detections in uncertain and complex situations Electronic systems handle information with selected coding quickly and efficiently. |
| 2. Finds it difficult to deal with tight deadlines: In combination with (1) above. In combination with complex problems and important situations. | 2. Is very quick: Supplies an immediate answer to very complex problems with large amounts of data. Is not emotional. |
| 3. Finds it difficult to process several alternatives at the same time: Selects one alternative and locks onto it: Reinforces what is favourable to the selected alternative, and suppresses what is unfavourable to the selected alternative. Finds it difficult to accept that he is wrong and finds it difficult to change opinions. | 3. Follows up all given alternatives at the same time and updates these in order to detect changes in the situation: Deals with large and small pieces of the puzzle in the same methodical way. Does not forget, does not get tired, but provides a complete result. Immediate reaction when the probability for different alternatives changes. |
| 4. Finds it difficult to work with fragmented information: Finds it difficult to see elements that do not fit in and that make the development head in a completely different direction. | 4. Works with the information available and provides a measure of quality (probabilities): Tests each piece of the puzzle against every alternative and calculates new probabilities that provide immediate information about changes. |

2. Description of Related Art Including Information Disclosed Under 37 CFR 1.97 and 1.98

Not Applicable.

BRIEF SUMMARY OF THE INVENTION

The invention is a technical method for a plurality of applications:
a. The invention results in known needs and problems actually having a technical solution.
b. The invention results in the method being able to be realized in a technical arrangement.
c. The technical feasibility requires the invention to work with other methods than those that are immediately available to people.
d. The invention is a technical method that is excellent in areas where people are weak. People find it very difficult to handle uncertainties, particularly in association with tight deadlines. There is a way of handling uncertainties in a reliable and scientifically-tested way and this is using probabilities. With expertise, it is possible to calculate probabilities. However, people find it very difficult to evaluate probabilities, that is to determine, in a given situation, the probability that one thing or the other will occur. The invention includes a technical method step that solves the problem.

The technical problem that is solved is based on the need or requirement:
a. to be able to detect a given parameter (an object) in spite of the fact that there are uncertainties associated with the detection
b. in addition, to be able to handle (control, monitor) the problem or the situation that the uncertain detection indicates
c. in addition, to select means (resources, abilities) for controlling/monitoring the development of the indicated situation
d. in addition, to be able to implement the said actions before it is too late. (Method: Prediction creates a time margin from the time that a situation has been predicted until it occurs in reality. During this time, actions can be implemented to prevent the predicted situation occurring.)
e. in addition, to predict the development of the indicated situation, with or without taking into account selected means of control
f. in addition, to be able to handle (control, monitor) the problem or the situation that is indicated by the prediction
g. in addition, to succeed in carrying out the said selected actions and predictions, even when they involve uncertainties.

The detection problem (a) above can be likened to the well-known radar problem of detecting a target in noise or clutter. When the radar echo (a pulse response) from the target lies within the noise level, the detection is uncertain. By means of, for example, integration of several pulse responses or suppression of clutter, the detection probability can be increased. An example of requirements for radar systems is that the detection probability is to be >90% and the risk of false alarms is to be <$10^{-6}$ in a specified situation. These values are to be achieved with a particular energy level of transmitted radar signal in relation to noise and clutter level.

Radar utilizes the fact that a lot is known about the signal that is received (an echo of a transmitted pulse). In signal-interception systems, less is known about received signals. Here, there can be a broad search covering all types of signals, for example when not expecting anything in particular. However, it can be decided in advance to search for a particular type of signal on the basis of the fact that it is known that it can be expected or that it would indicate a serious threat.

In the invention, the fact is also utilized that the electronic system knows something about the parameter that it is to detect. "It is easier to find something, if you know what you are looking for".

The invention does not only handle signals from sensors such as, for example, the said radar and signal-interception systems. It also handles more processed information based on previous processing of signals and also supplementary information from other sources of information.

The abovementioned need or desire does not, in fact, end with a detection of radar signals or other signals. In military applications, there is also a need to know, for example, what caused the radar echo or other detected signals. Do the signals come from a radar that is on a vessel or aircraft, etc? And if it is on a vessel, there is a need to know what type of vessel it can be and what other equipment, sensors, weapons, etc, are on the vessel. Nor does the need to know end here, but there is also a need to know the objective of the vessel, where it is going, which other units it is working with to carry out the said objective, etc.

The problem associated with detection usually becomes more complex and uncertain, the wider the scope of the requirement. If, for example, the requirement is to detect the objective of the vessel, then this might be carried out using a number of different observations, for example:

The radar provides position, course and speed, in addition to size and vessel

Signal interception provides information about the type of sensors and communication system Video images provide certain characteristics, for example additional information concerning sensors, weapons, type of vessel, etc.

A library of different vessels and their data, equipment, etc, provides a possible identity, on the basis of the abovementioned observations.

Together with the above information about the vessel, additional observations by aircraft, vehicles on land and vessels at sea, etc, can provide an idea of the objective of the vessel as part of a larger objective.

All the observations above contain uncertainties. For example, three different radars can detect the same vessel. Does the total information represent one, two or three different vessels? Technology that correlates information from different radar systems is usually called data fusion.

Fusion of different sensor systems is more difficult, as the sensors provide different types of information: The radar provides points on a screen, the video provides images, the signal interception provides wave forms for signals, pulses, frequencies, etc. The uncertainty increases: which radar point goes with which image and with what in the image, and which signal pulses? Are the observations from different entities?

Data fusion utilizes the fact that radar provides the same parameters, that is a technical arrangement can compare two detected radar targets—parameter by parameter, for example position, size, course, speed. Here like is compared with like. It is not possible in the same way to compare the image's colour structure with the radar target's speed or the modulation frequency of the signal. Technical operations require the same parameters or relationships between these. The problem of obtaining added-value (synthesis) information contributed by the different sources can be likened to a jigsaw puzzle: You have three different pieces, but do not have the intermediate pieces that can join them together. Or perhaps the pieces are not even from the same puzzle.

Library information often consists of text information, which is neither radar points, video images nor signals. How does such information fit together? Other observations can be reported by human observers, with associated uncertainties in the descriptions.

A person can look at each type of information from the five sources above, and form some idea, as each source's information is displayed in a human-friendly way. A technical system does not have a person's ability to combine different types of information in a synthesis, but must have a different way of working.

The invention relates to a technical solution which satisfies the abovementioned needs and desires.

A number of technical problems can be identified:
How components from different sources of information consisting of different parameters and descriptions are handled, so that they contribute to an increased level of information.
How uncertainties in information from each source and the uncertainty in the combined information are handled.
How the fact that the information is incomplete is handled, also in combination with the fact that the significance of the fragments that are available is also uncertain.
How a technical method and arrangement can be designed, which can solve complicated problems better than a person.

a1. The invention comprises several technical solutions. First, the invention comprises a system solution with a method step: a structure solution. Traditionally information is complied "bottom-up". This means that it is difficult to compile information, as there are so many possible ways, when it is not know what it is going to be. In complex cases, it quickly becomes unmanageable. Compare the example above for different types of sensor: The three abovementioned pieces of the puzzle can be imagined as being comprised in different ways as pieces in a very large number of different possible puzzles.

The invention includes a completely different method step:

In the invention, the method commences with what the result is to be, that is the method commences with a number of alternative hypotheses. And then it is compared how the pieces of information fit in the respective alternatives. In the example with the pieces of puzzle, the system starts from completed "puzzle pictures" (not cut-up pieces). The system then compares whether and where the "image information" in the puzzle pieces fits into the whole "puzzle picture".

In the example above, it was a question of detecting the vessel's objective comprised in a "larger objective".

A small number of "larger objectives" is selected. In most cases, the number is very limited. Thereafter, a number of key capabilities are identified which are required in order to carry out the respective "larger objectives". Here a number of vessel objectives and the key capabilities that are required in order to fulfil the objectives can be identified.

Thereafter the system can start searching for a vessel with the given capabilities, which is located within the area concerned and behaves in accordance with the objective.

This technical solution means that the method can be realized with reasonable technical effort and with reasonable technical arrangements.

a2. Second, another method step in the invention determines which coding for the information is to be used for compiling the contribution from different sources.

Example a21: A limited number of alternative types of vessel are to be found with capabilities within the sought area.

These alternative vessels can, for example, be detected in a library. From this, the different characteristics of these vessels are detected, concerning, for example, size, shape, method of propulsion, radar, communication equipment, etc. These characteristics can then be investigated using selected sensors, for example using sonar for investigating the means of propulsion characteristics. The collected information is compared with the alternative vessel options, and the probability of the result is calculated taking into account the uncertainty. With information from only one sensor, perhaps four alternative vessels are possible with approximately the same probability. With additional information, a different probability distribution is obtained. It is possible, for example, to have the probabilities 60%, 20%, 10% and 10% for each of the four vessel options.

Example a22: The result of (a21) can be that a vessel is detected that can contribute by 30% to the sought capabilities. This means that the probability that this individual vessel carries out the hypothetical objective is very low. Later, additional vessels with the sought capabilities are detected, (for examples three such vessels), so that the probability of carrying out the vessel objective is high, and the contribution to carrying out the associated "larger objective" is fulfilled. Accordingly, the probability increases for it being this selected vessel objective in the selected larger objective, that is the correct hypothesis.

On the other hand, if only one sought vessel is detected, and at the same time other detections of capabilities are also made, which together agree with a second hypothesis for the "larger objective", then the probability for this second hypothesis is higher.

Choice of information coding: We can see from the above, that a method step in the invention is to select a suitable information coding, in which the same parameters can be compared.

If the aim is to be able to detect the "larger objective" or a comprised vessel's objective, then a key piece of information is capabilities. The hypothesis concerning one of several objectives is followed by a conversion of the objective to a need for capabilities, for example vessel capabilities.

On the other hand, a vessel can be detected by reconnaissance/observations that fulfils certain of these capabilities. The invention then carries out the method step of converting information on the Hypothesis side and information on the Reconnaissance side to information with same information coding, in order to be able to compare the same parameters— here capabilities.

A capability can, in turn, be divided up into, for example, function and capacity, where capacity can contain a value, number, etc. The functions can then be compared with each other utilizing the capacity values.

The choice of information code is not arbitrary. The invention comprises selecting an information code that is technically reasonably easy to handle. For example, information on the Hypothesis side should be able to continue to be recoded from "capabilities" to types of vessel and, in addition, to vessel data and vessel equipment and also to observable characteristics. The Reconnaissance side should then find observable information of some type or types, depending upon the available reconnaissance resources, for example images, radar echoes, wave forms. Each type or parameter on the Hypothesis side can, in certain cases, be compared with the same parameter on the Reconnaissance side.

It can be possible to realize the above comparison level in special cases. However, it is the case that the uncertainty (the number of possible alternatives) on the Hypothesis side increases greatly for each transformation downwards in order to be able to match every possible characteristic on the Reconnaissance side. The problem easily becomes unmanageable. The invention's technical solution comprises a weighting, whereby the number of combinations is kept down.

The Hypothesis side contains few alternatives at objective level. Recoding to the capability level usually involves a small increase in the number of alternatives.

The Reconnaissance side is limited by the number of actual observable entities. There may, for example, be few vessels in the area. Recoding of these vessel types into their sought capabilities usually involves a small increase in the number of alternatives. This applies, in particular, to the preferred case when the capabilities relate to capabilities at "objective level", for example aerial combat, underwater reconnaissance, etc.

Another way of regarding the choice of information code is its natural capability to be a measurement of the most interesting characteristics of the application. Capabilities can, for example, be compared between two parties in order to evaluate the probability of winning for the respective party. Also here, capabilities at objective level are of interest.

Example (a21) above can be used when the aim is to detect a particular vessel (identity) or a particular type of vessel. The hypothesis then commences with the given vessel. The vessel is recoded to observable characteristics. This results in a profile. Reconnaissance results are compared with the profile and the probability of detection of the correct vessel is calculated. See section a3 below.

a3. In (a2) the value is emphasized by choice of parameters, so that it is possible to carry out comparisons or more general different types of calculations, for examples the probability calculations described below. It is not sufficient for the system to be recorded to the same parameters. In addition, a third method step is required for handling uncertainties in the detection. This step comprises calculation of probabilities in order to ensure that the outcome is true for the required information.

The description is based on the radar application's detection probability and false alarms.

Example a3.1: Task: Find (detect) a given type of vessel, which can be expected to appear in a given area.

Reconnaissance can, for example, be carried out using radar, with detection indicating the position of a vessel. The type of vessel is not apparent. The rough conclusion is that it could be the sought vessel.

Conclusion: High probability that it is a vessel, but great uncertainty regarding what type. Additional observation, for example by video, can provide images, in which certain characteristics can be observed. The vessel can, for example, be judged to be one of four different types. If the sought type is not included in the four possible types, there is a high probability that the detected vessel is of the wrong type. If, instead, the vessel is included, then the probability increases that it may be the correct type—but the uncertainty is still great.

Using reconnaissance results from other areas, it appears with very great certainty that all known vessels of two of the types are located in other areas. Of the remaining two types of vessel, there are two and four vessels respectively, whose locations are unknown. The sought vessel represents with great certainty the type with two unknown.

Conclusion: Without taking into account other uncertainties, the most recent information (two vessels out of six) gives the detection probability 2/6. The overall probability can, however, be quite different on account of other uncertainties, in accordance with the above.

Example a3.2: If the example above is expanded to the task of detecting the vessel's objective comprised in a "larger objective", then this detection probability requires additional and different information concerning relationships, etc. For example, both the remaining two types of vessel can have a function that is required for the vessel objective in question. Accordingly, the indication of and the detection probability for the objective in question increase.

In addition, however, the types of vessel have different capacities. The first type of vessel has the capacity 1 and the other 0.5 in relation to the requirements for the objective. Together with additional information (more pieces of the puzzle concerning entities, etc,) comprised in the larger objective, a detection probability is to be calculated. A new detection probability can be obtained if an additional vessel is detected in the area.

Conclusion of the above example: The detection probability is affected by the information that is available. Additional observations provide additional pieces of the puzzle, which provide new detection probabilities—higher or lower depending upon the information. In a dynamic environment, where events are occurring and being observed over time, the uncertainty can reduce and the detection probability can be given with greater certainty.

A supplementary measurement in the detection probability is the False Alarm Risk. The term is used in accordance with the above in radar applications. Here, the use should be that the system informs (gives an alarm) concerning a detection only if the detection probability is above a certain limit, for example 50% or 70%. If the limit is set very low (for example 10%), then almost all vessels will give an alarm as the "correct type". This is good in as much as it can be certain that the correct vessel is also included. It results in a high alarm probability. It is, however, not good in as much as there are also very many false alarms. If the limit is set high (for example 90%), then there is a great danger that the correct vessel will be missed. The system does not receive so many different indications (pieces of the puzzle) that the certainty for correct detection can be so high. It results in a low alarm probability. It is, however, good in as much as there are also few false alarms.

Note that, in radar applications, the concept "detection probability" is the same as the abovementioned "alarm probability". Here (in this invention), "detection probability" is slightly different, that is the natural term for a detection being correct. The False Alarm Risk is then the probability that the respective detected vessel is not correct, multiplied by the relative number (the frequency) of such vessels, that is $\Sigma_i [(1-\text{the detection probability})_i * n_i]$, where i stands for the respective type.

The limits discussed above are often used in presentation to humans, who cannot handle uncertainties and probabilities. Everything that is above a certain probability level is presented as if it was correct, and everything below the level as if it did not exist. Compare this with the radar case, where a target is presented without any information about the risk that it is incorrect or, alternatively, without supplementary information to the effect that this can be a target with a particular smaller probability.

The invention comprises, in addition to the setting of limits, handling uncertainties using probabilities for detections. For a number of different possible alternatives, each alternative can be listed with its probability, for example, in the abovementioned example with the four types of vessel, the probabilities can be calculated for the respective types, so that the probabilities are, for example, 60%, 20%, 10% and 10%.

Instead of picking out the 60% alternative as correct and the rest as non-existent, information can be provided about all the alternatives. When there is as much as a 40% probability that the 60% alternative is not correct, then this can mean that at any rate the 20% alternative must be considered, and then with the knowledge that this is only ⅓ as probable as the 60% alternative.

The technical solution is based on the abovementioned principles in (a1) and (b1) and handles complexity in such a way that selected parameters are compiled as a profile for the sought result. The probability for the detection result is obtained according to the method step comprised in the invention, by a corresponding observer-based parameter profile being generated from the observation information. In addition, probabilities are calculated on the basis of comparisons between the profiles. Deviations in average values and individual parameter values are also handled by the invention. Correlations are comprised in the method step as measurements in conformity between profiles and for probability calculations. They are also comprised in the invention's prediction methods and provide values for prediction accuracy. This is described in greater detail in the method step "Prediction" below.

In addition, the method step comprises calculating probabilities in an environment where new information is obtained, for example in response to a dynamic development of situations and events. The new probability for an alternative in question is calculated on the basis of the previous information (the probability) and the probability for the new event being a consequence of (being related to) the said alternative in question. In this way, probabilities can be updated when new related information is obtained.

a4. The fourth method step Prediction utilizes the method step Structure Solution. In the invention, the event development that leads to the given result is predicted, that is according to an alternative hypothesis. The method step is based on the current situation and predicts the respective developments of the situation in accordance with the respective alternatives from a number of alternative hypotheses.

Results according to the alternative hypotheses form the starting point for an additional process, a Strategy Chain. The Strategy Chain describes the activities that may need to be carried out in order for the result to be obtained.

The prediction can be carried out according to several alternatives, for example:

The prediction is carried out in parallel with the Strategy Chain—activity by activity, until a selected time horizon has been reached, or until the selected partial result or end result has been obtained.

The prediction is carried out according to a selected short cut (that is a rapid action alternative) in the direction towards the selected partial result or end result. The prediction can then cease if and when the selected time horizon has been reached.

In this way, the prediction is related to the respective hypothesis and hence to the probability for this. Accordingly, a probability for the prediction can also be determined.

The abovementioned method step according to the invention is a precondition for a technical solution being able to be obtained. The traditional method is to commence with the situation that has been detected and from there predict a continuation. This method usually comprises so many possible outcomes that the prediction is not of interest. For example, it is common to predict a future position of a warship by drawing a circle around the vessel's current position and saying that in x hours the vessel will be located within the circle. (The radius of the circle is the time*the speed).

According to the invention, the vessel's movement is determined instead by a selected hypothesis and the vessel's new position is predicted along an associated direction, that is the result is a position with much less uncertainty associated with the position. And, in addition, the probability for the new position can be related to the probability for the hypothesis.

For predictions of more complex courses of events, the method steps Information Coding and Probability can also be utilized.

The invention according to the above-mentioned method steps has some distinct characteristics and technical considerations. The invention is, in some ways, crystal clear. By turning traditional methods and perspectives upside down, technical solutions can be obtained where it was previously thought to be impossible, or at least very difficult.

In the invention, several method steps have the character of the reverse procedure compared with traditional human processing and also the reverse procedure compared with attempts to achieve technical solutions with the traditional "bottom-up" perspective.

Some examples:

Traditionally, we commence with a situation and the information that is available, and from there work forward to increased knowledge by obtaining additional information, etc, in order possibly to be able to reach a result.

In the invention, we commence with the result, or alternatively with hypotheses concerning the result.

And, in a number of cases, such as, for example, in the construction of the Strategy Chain (according to the above), the invention works "backwards" from the result to successively earlier steps.

Traditionally, we commence with the information concepts that are available in the situation in question, for example from sensors and other sources of information. And we attempt to handle the processing of these concepts using technical methods in order to be able to attain the required result.

In the invention, on the other hand, the method commences with operational concepts associated with capabilities in order to attain the result. Information is recoded to a common information code, which in turn is selected to be able to be handled using the invention's technical method solutions.

Traditionally, probabilities are calculated commencing from the current position, and thereafter probabilities are calculated for the outcome taking into account the whole outcome space.

In the invention, on the other hand, the method step Probability commences with a result and handles the probability that detected events/activities are a link in the strategy chain that leads to the said result.

Summary: The results that the invention can achieve can be very difficult or impossible to achieve using traditional technical solution methods or by human involvement.

The objop structure can contain a number of alternative hypotheses consisting of variations of sub-goals, COAs, capabilities and resources. Then the obsop detections are compared with the respective hypothesis and probabilities can be calculated for the alternatives.

Figure 4:
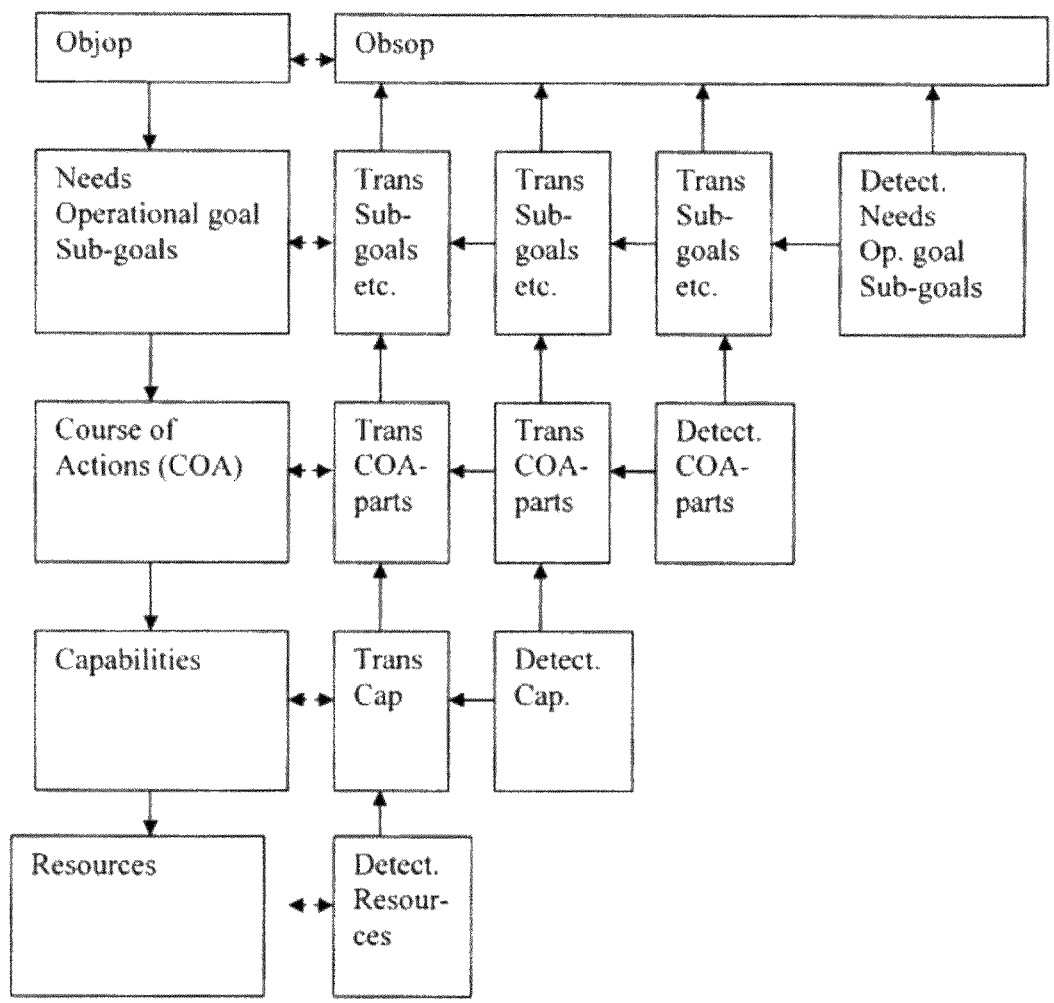
FIG. 4 is an example of FIG. 3 with a perspective on the objop and obsop relations, including an objop-process for an opponent or other party and the corresponding obsop-process. Detections can be made at different levels of the objop-structure. Detection of resources (in obsop) can be compared with the objop-resources, and/or be transformed to capabilities and together with detected capabilities be compared with objop-capabilities, and so on for higher levels. The detection process is dynamic and as more information is obtained/detected, the probabilities will change accordingly.
Figure 5:
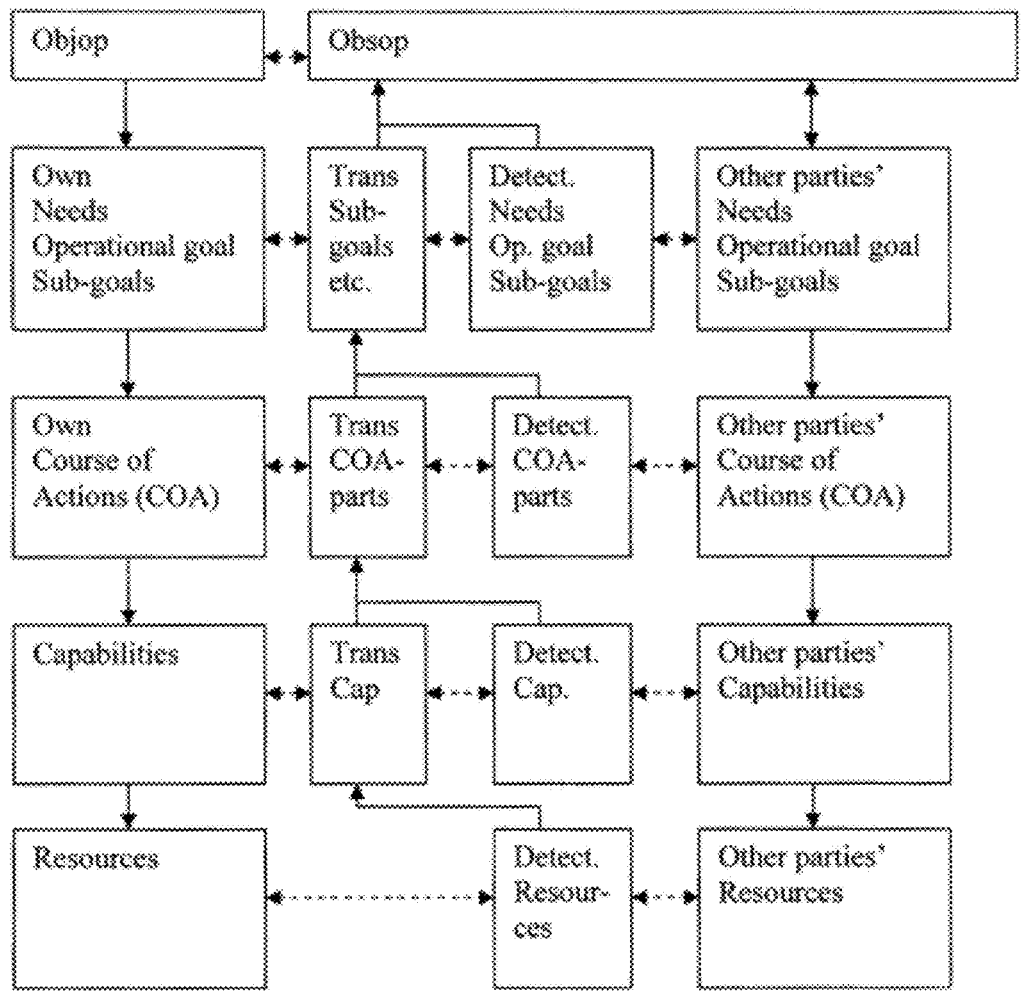

FIG. 5 is a further developed example from FIG. 4 with a perspective on Own processes, where the objop-structure is the Own objop, and Other parties' (including opponent's) "objop"-structures are included in obsop. Other parties' objop-structures can e.g. be the same as in FIG. 4. Those objop can be compared with the Own objop, and probabilities be estimated for achieving Own goals or success of Own actions at the various levels of the structure. Then the same kind of detection process as in FIG. 4 will add information at the various levels and the probabilities will be updated accordingly.

Figure 6:
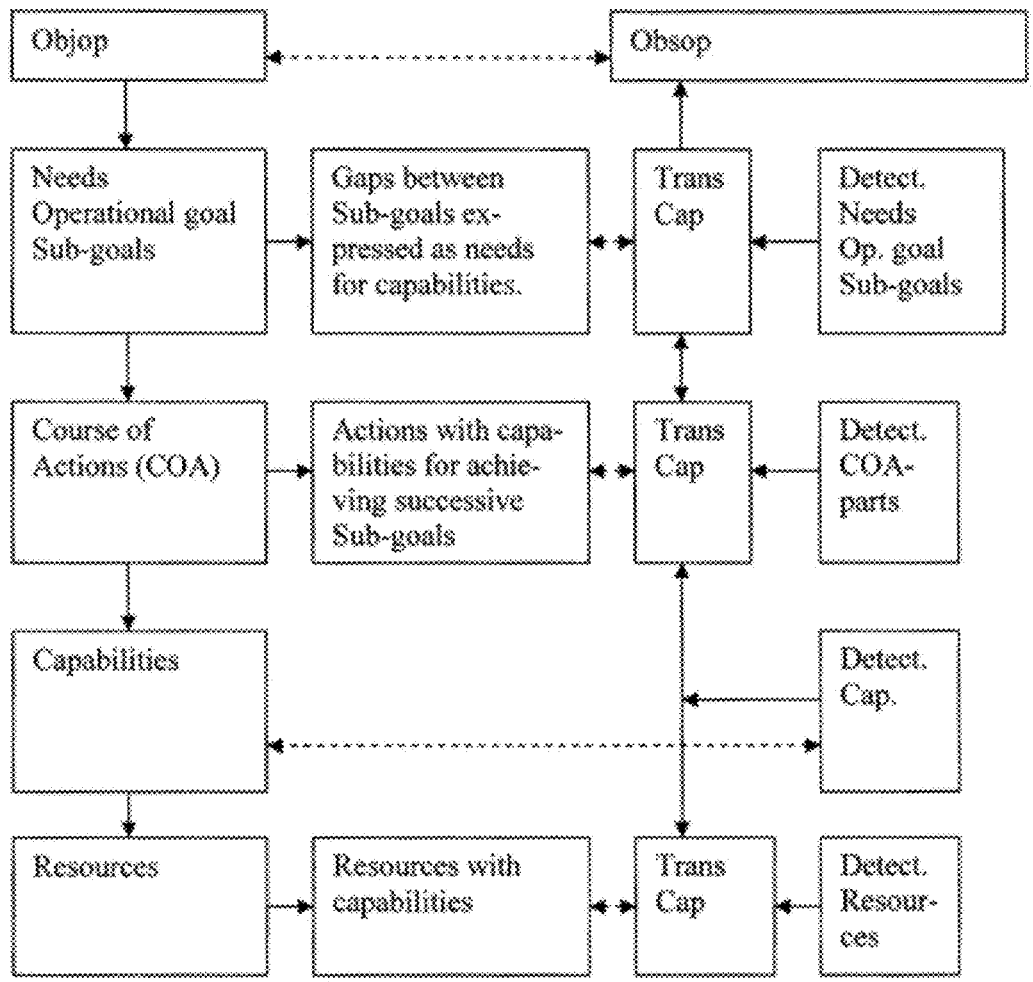

FIG. 6 is an example of FIG. 4 with a capability oriented process perspective. In the comparison between the objop-structure and obsop-structure, parameters are transformed to capabilities. By a common parameter and quantification, comparisons and detection probabilities are simplified.

Figure 7:
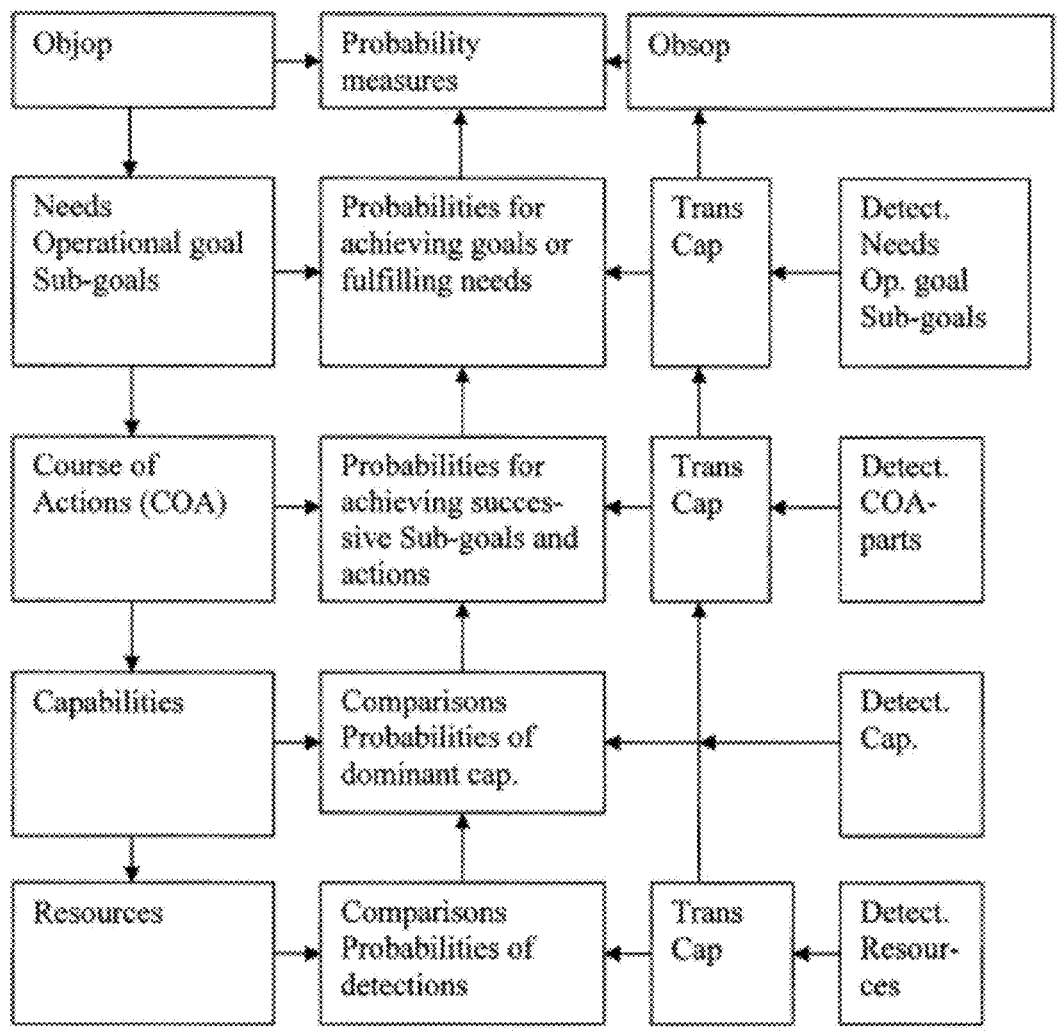

FIG. 7 is an example of FIG. 6 with a focus on the probability perspective. It includes: detection probabilities, for detection at various levels in the structure; probability of dominant capabilities at various levels in the structure; probability of success for achieving sub-goals etc. at various levels in the structure; and probability for intentions or total operations or achieved system states.

Figure 8:
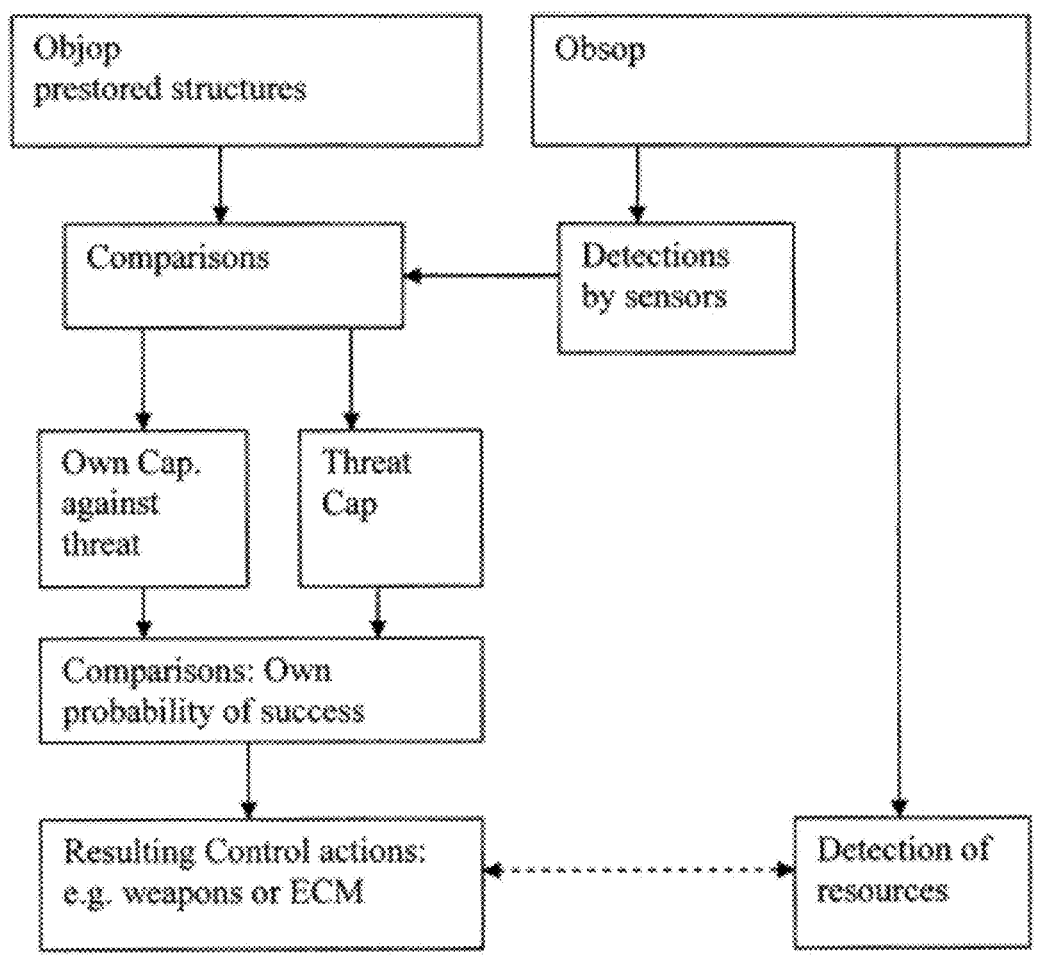

FIG. 8 is an example of continuation of FIGS. 5-7 with an automatic perspective on the whole operation chain, including execution. Then objop contains pre-stored structures for common or time critical cases, and obsop includes sensors for indicators at objop's upper structure levels, e.g. with capability measures. Then there are comparisons with possible capabilities, and probabilities for success are used for selection of control actions. Then adapted sensors, e.g. tracking sensors, for the control actions are used for detections. Those adapted sensors are usually at least partly different than those for detections at the upper structure level.

Figure 9:
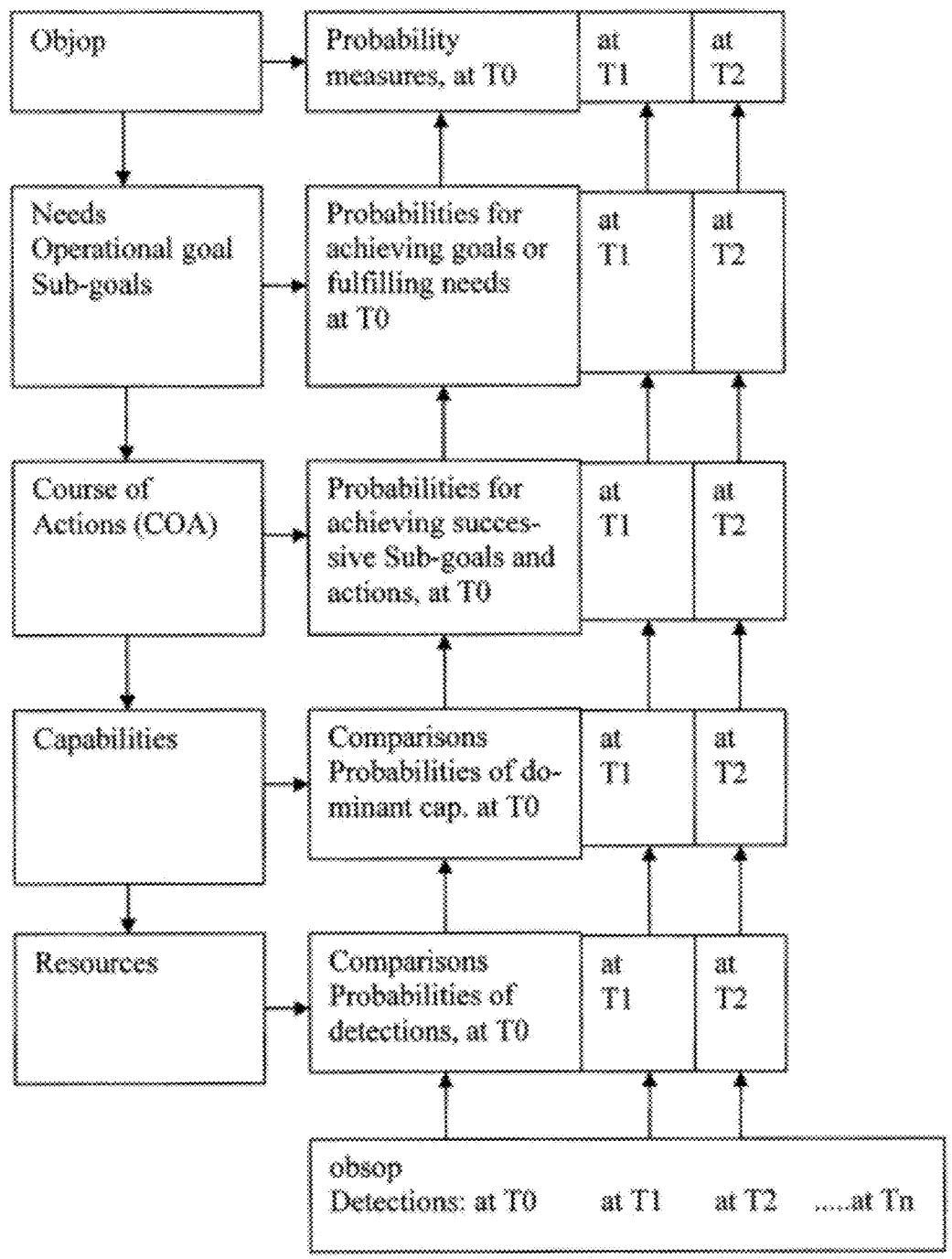

FIG. 9 is an example of FIG. 7 in a dynamic scenario, where new detections are made successively as time is running. The probability-values at different levels can be updated at shown time-stamps T1, T2, . . . Tn.

Figure 10:
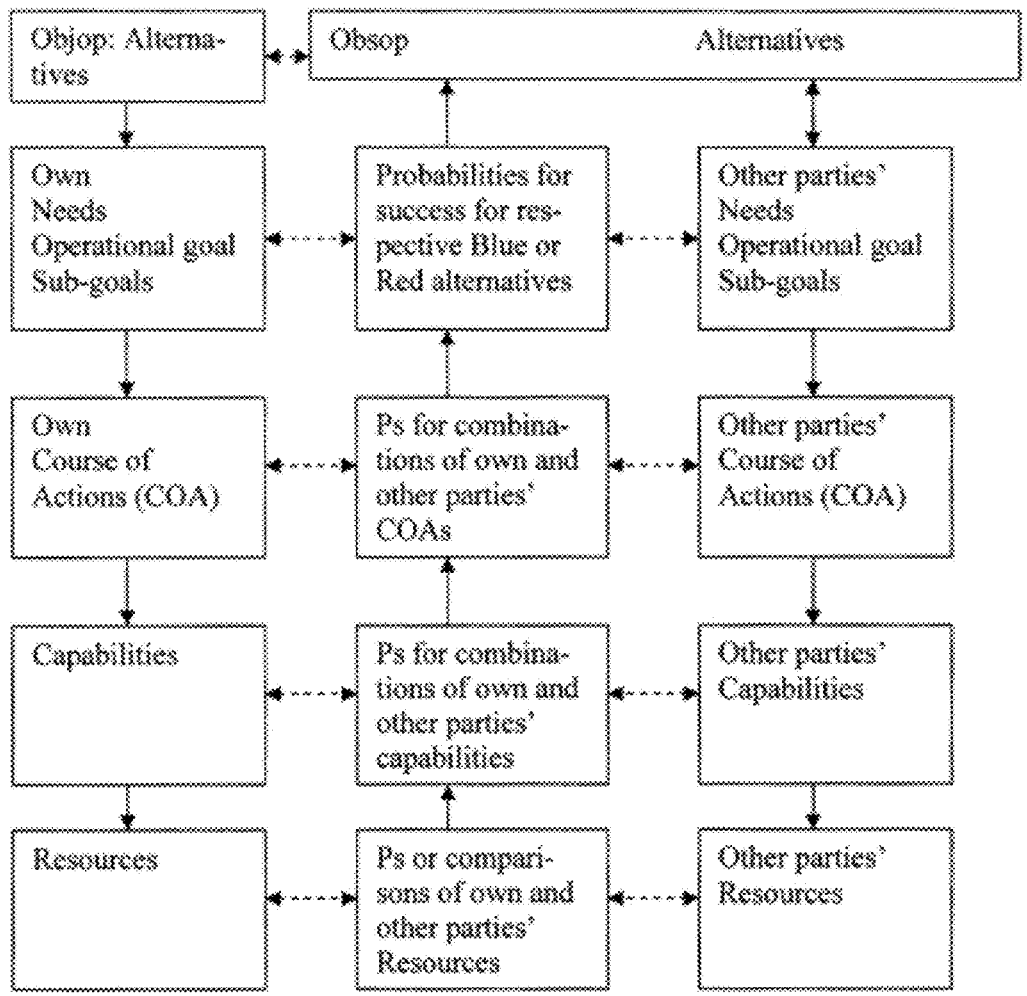

FIG. 10 is an example of FIGS. 5-7 with a focus on alternatives of own and other parties. An own alternative is compared with selected alternatives of others and vice versa and the probabilities for success (Ps) are estimated for e.g. own alternatives dependent on the choice of alternatives for other parties. Thus, probabilities for selected alternative combinations can be estimated.

Figure 1:
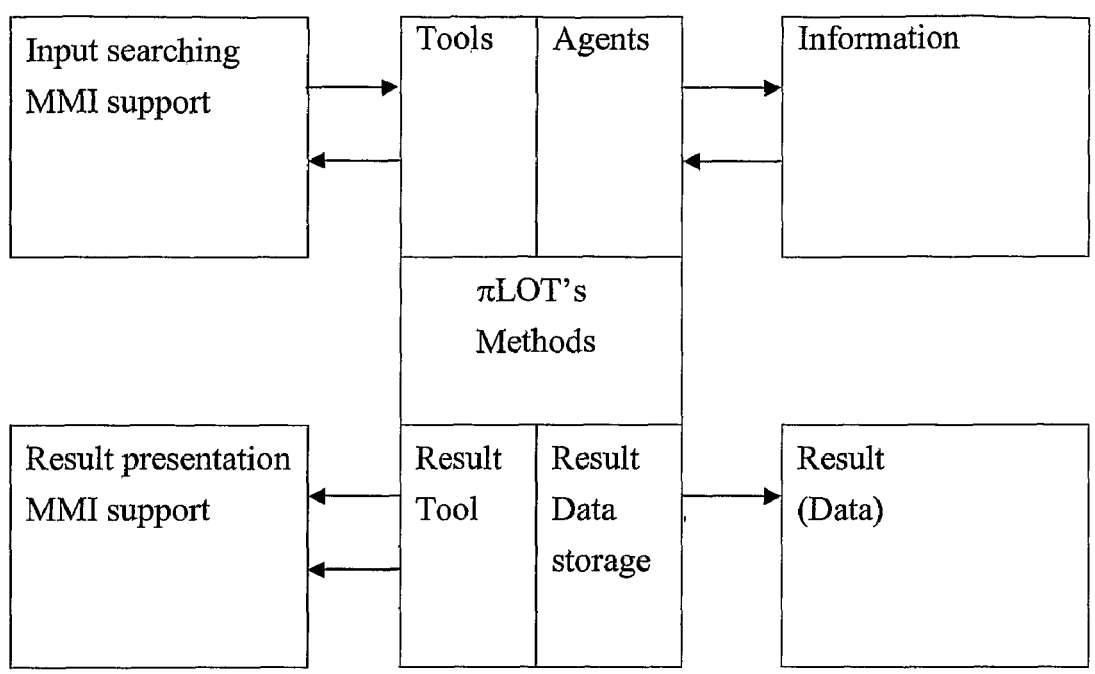
FIG. 1 illustrates the structural design of the arrangement. The electronic system's Core Methods appear in the centre in the drawing.
Figure 2:
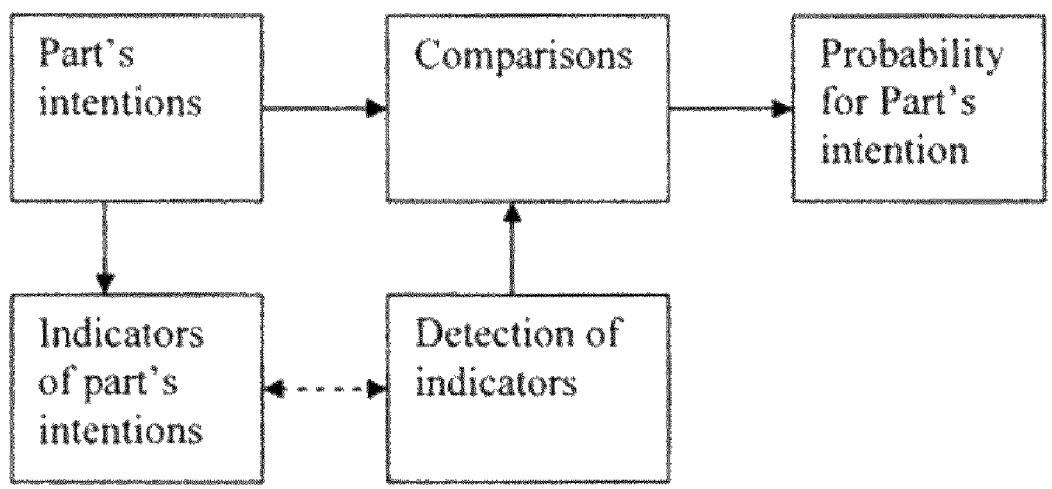
FIG. 2 is an example of the detection principle. There are indicators on a part's intentions, which can be detected. The detected indicators are compared with various alternative intentions. Depending on the various levels of agreements, various probabilities can be estimated for the said alternatives. The principle works for other functions than intentions.
Figure 3:
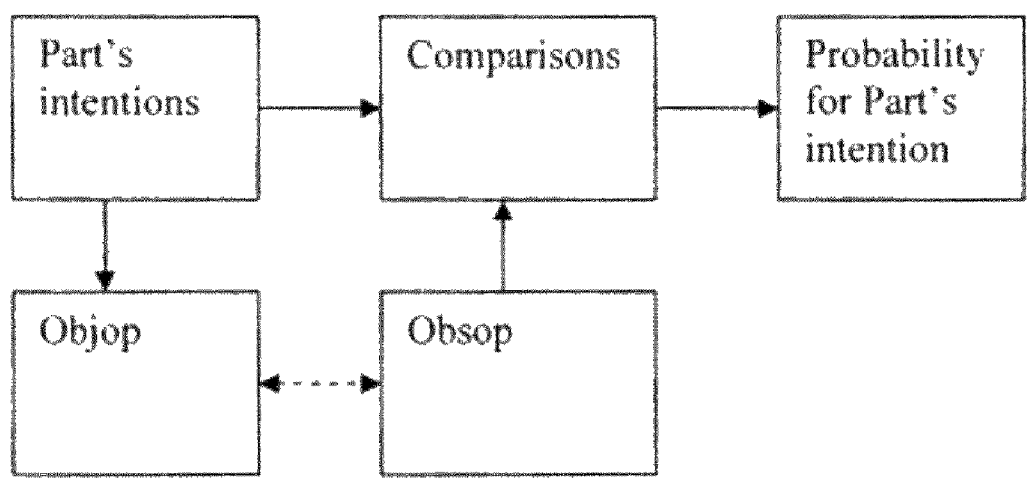
FIG. 3 is an example of FIG. 2, where indicators are derived from objop and detection from obsop.
Figure 11:
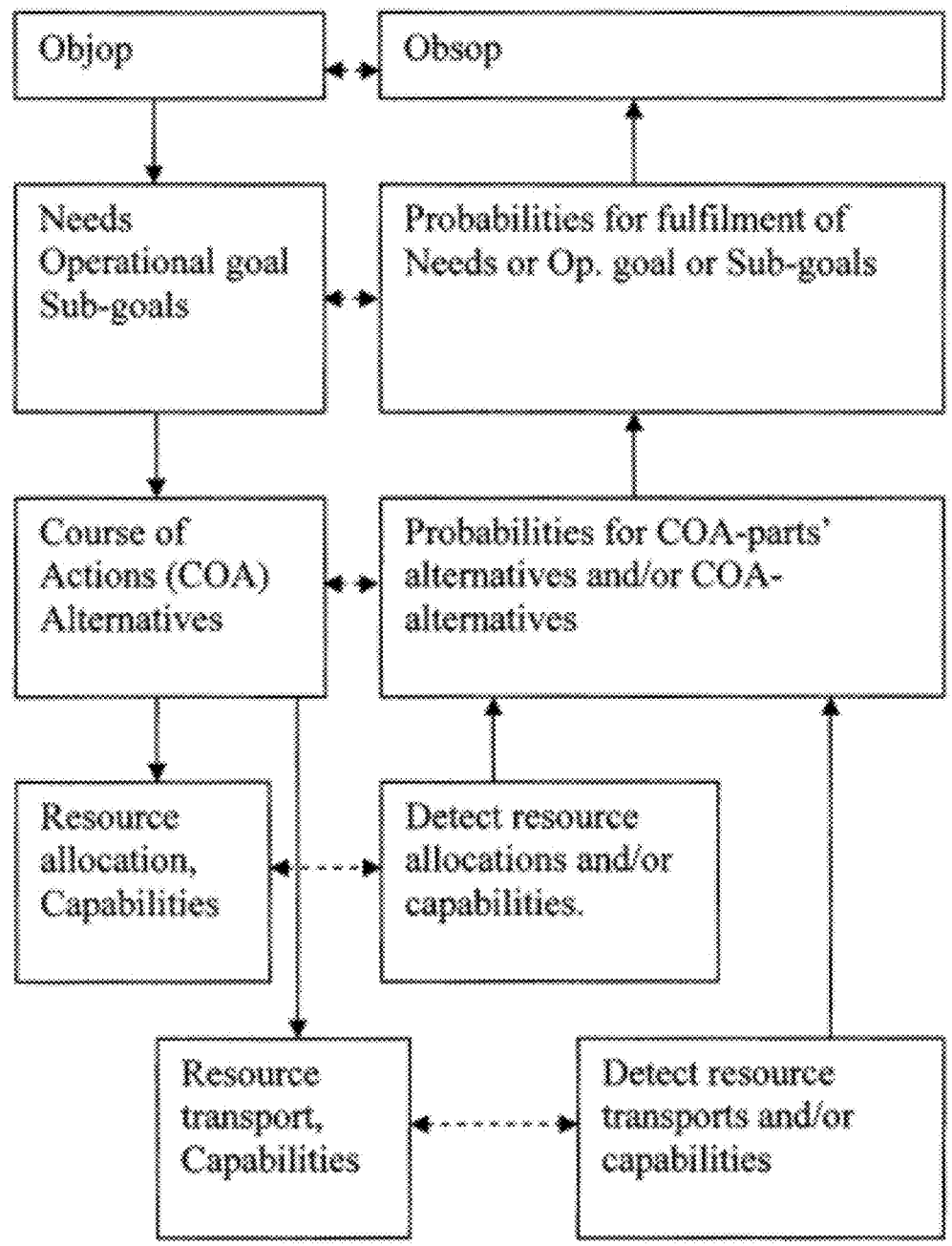

FIG. 11 is an example of FIGS. 2-4, where the indicators are the operations; resource allocations and resource transportations. Those operations are examples on COA-parts. Various alternative COAs contain their respective resource allocation and resource transportation, which are compared with the detected ones. Probabilities are estimated for the respective COA-part alternatives and the COA-alternatives and further on in the structure.

Tools for data entry and display provide the Man-Machine Interface that an operator requires in order to be able to use the invention's functionality. This is illustrated on the left in the drawing.

DETAILED DESCRIPTION OF THE INVENTION

Using the Man-Machine Interface, the operator can select sub-services from a list.

The Man-Machine Interface comprises a Data Entry service, where interaction with a tool helps the operator to enter his information quickly and in a structured way. Parameters are selected to suit the applications of the Core Methods. The invention comprises designing the tool in such a way that the operator can enter in tasks using his concepts and terms (his professional language). Thereafter, there is a technical recoding to concepts that match the technical processes in the Core Methods.

The sub-services that the operator requested, are carried out by the Core Methods (centre of the drawing), and the result is presented using a Presentation service comprised in the Man-Machine Interface. A tool helps the operator in modifying the presentation.

These methods are the central or basic methods in the invention.

At the top right in the drawing are Agents. (An agent is a type of object that can carry out services.) These are the electronic system's search agents, that is services utilized internally by Core Methods. These search agents have the capability to search for information externally.

In order to carry out the search, the search agent utilizes existing external functions for communication over a network, etc.

For searching on the Internet, existing services are used, for example established search engines.

For searching within an available information system, a service depot can be used, where approved information services are registered.

The search agents can also request subscription to information, for example from a particular sensor system, positional images for the airspace within a particular area, etc.

The search agent's search capabilities are more general, as the information that is sought changes for each task and is determined primarily by the operator's data entry via technical recoding in Core Methods.

At the bottom right there is a Result service. This can be utilized by other systems, for example by a similar local arrangement (with function) in a different organization. The system is searched and the result is received by a "Search agent", whose function has been described above.

This external communication of results differs from the above-mentioned presentation that is intended for humans.

The arrangement can be designed as individual electronic components for each individual function, with data busses between them for communication between the components.

The invention's functions can advantageously also be used in several existing electronic systems for different applications. One example is management systems for military applications. In certain cases, these systems are very large electronic systems, where quantities of general functions are available. These functions can be used as support functions for the invention's system and method functions. This means that there are, functions, for example for communication and MMI, that can be utilized.

It is also an advantage if inexpensive basic technical systems can be utilized to support the invention's technical system solution. The invention has been specially designed to utilize such basic technology in generally-available (inexpensive) devices, such as, for example, PCs. This makes the support functions available to users at low cost.

The invention's technical solution is, however, not bound to any one particular kind of basic equipment. The arrangement can be constructed of several different units. What is required is digital electronic circuits that can handle data in accordance with the methods described.

Example: When large quantities of data need to be handled quickly, special circuits can be tailor-made to carry out the invention's method steps.

The following provides examples of the use of the invention's technical solutions in military applications; specifically, military management systems. The invention's method automates processes and provides new types of information to management personal. Accordingly, the method can be regarded as a "Technical management function" with three main types of applications:

A. To generate information on the basis of probability values for alternative event developments and situations.

B. To generate information on the basis of probability values in order for friendly-side action alternatives to be successful. And with the use of (A), to generate probabilities for alternative consequences (new situations).

C. Combining of (A) and (B) above in order to generate information about friendly-side actions related to the situation development.

The method can be used with different degrees of automation, including a far-reaching automated process. In military applications, for example, new information from sensors can be processed (according to A) and can result in a generated threat situation, which is processed (according to B) and results in a choice of action, a generated combat, for example mid-air shooting of an attacking missile. The whole process—from the sensors' detection of the target and the sensor information entering the Management function—to control of weapons until the missile has been engaged in combat—can thus be carried but completely automatically. By this means, such quickness of reaction can be achieved, that is not possible when a human's evaluation time is involved in the process. In addition, the choice of action/weapons can be optimized with regard to the probability of succeeding, on the basis of the threat situation and the uncertainties and probabilities that are associated with the various steps in the process.

The method can also be used in situations with less requirement for speed but with a component of uncertainty, as an important part of the application. In military applications, uncertainty is normal. The information about the enemy and his resources is incomplete, and secrecy about intentions and plans is a matter of course. Uncertainty is handled using probability values.

The method can be used for predictions. In military applications, a time advantage is striven for, and decisions are often taken under pressure of time. Predictions create the possibility of understanding what is going to happen before it happens, and, by this means, it is possible to obtain a time margin during which action can be taken. Predictions have different degrees of uncertainty.

Known technology within the area is related to military applications.

The traditional way of working with information comprises:

Long-term intelligence work. Information is collected concerning an enemy's resources, methods, technology and other characteristics.

Ongoing monitoring. Observations of activities.

The ongoing monitoring utilizes advanced sensors, for example radar in order to see far away, passive reconnaissance involving transmitted radio frequencies, electro-optical reconnaissance within IR and visible light. Sonar is used under water.

The trend is towards increased requirements for more information.

Previously radar provided detection of targets and their position. The target's speed and position revealed whether it was an aircraft, vessel or land vehicle. Target traces and plots are used to follow the target's historical path.

There is now an attempt to obtain more information about the target. For example, which type of aircraft is it? Is it a bomber, fighter or reconnaissance aircraft? What type of vessel, etc?

Different types of information fusion are used.

By information fusion is meant methods for combining information from different sources in order to obtain increased knowledge.

Data fusion is used traditionally to track aircraft using several radar, and stands for "fusion" of information from the same type of source, the same type of sensors. Generation of target traces is a main purpose.

Information fusion from different sources (different sensors) is technically more difficult, as the data has a different format and different significance. Today, the compiling of the information is usually carried out in a person's brain, sometimes after manual (written) processing.

The known technology is used principally to improve target tracking, and to increase the information about the target.

In certain situations, for example in the field, there is also attempt to compile information about several targets located near to each other, in order to see whether these targets together constitute a military unit.

The known technology can be called a "bottom-up" approach. Through finding out more and more about each target, it should be possible to understand more about what is happening, that is to understand more about the situation.

This hypothesis has serious limitations. More information can mean that what is important is hidden by details: "You can't see the wood for the trees". It is obvious that you cannot find out the enemy's intentions by, for example, studying his aircraft in detail. If four aircraft are detected, and you know all about the type and equipment, then this does not mean that you know where the aircraft are going or what they are going to do when they get there.

The invention is based on a "top-down" approach. It starts from having some knowledge about what you want to find information about. The knowledge can be uncertain, for example the fact that the enemy can act in different ways, three of which are reasonably, probable and one of which is particularly dangerous for us. Starting from these four alternatives, observations can be processed to see how these conform to the respective alternatives. It is possible, for example, to look for a certain type of aircraft in a certain direction, or process indications that there is an armoured vehicle in an area together with other observations, in order to see how this supplementary information is consistent with the relevant alternatives.
- a. It is easier to find something if you have ideas (hypotheses) about what you are looking for.
- b. If what you find is consistent with any one of the hypotheses, then this provides increased hope that this hypothesis might be correct.
- c. The interaction between (a) and (b) above can quickly provide an improved understanding of the situation.

Civil Applications. The invention provides a new method for information processing in Management and/or Information systems. In complex activities with the need for time margins in a dynamic market, the invention provides functions for prediction and handling of uncertainties.

The benefits would be particularly great in large conglomerations, such as, for example, large industrial companies, health care, civil defence and other government offices. High-technology companies, including service-oriented companies, should also be able to have great economic benefits from the invention.

Examples of Companies and Authorities:
The defence industry
Data communications and telecommunications
The car industry
Manufacturing industry
Distribution companies (transportation, electricity, etc)
Civil engineering companies (Planning companies)
Service companies (Data service)
Police
Rescue services
Fire brigades
Civil defence services
Health care
Hospitals The invention is well suited to both civil and military activities.

List of Civil Applications with Social Orientation:
Natural Disasters, Accidents, Technical Faults, Human Factors
- a. Forest fires
- b. Fires in built-up areas, chemical industries, etc.
- c. Flooding
- d. Transport problems
    - d1. Traffic jams
        Accidents involving injury with access problems
        Dangerous goods problems
        Event management (Football matches, political visits with risk of assassination)
    - d2. Damage to: Roads, bridges. Railways. Harbours. Airports.
- e. Major power cuts
- f. Interruptions or interference to telecommunications and data communications
- g. Pollution/infection of drinking water
- h. Chemical leakage
- i. Spreading of illness, Epidemics, Food poisoning
- j. Economic crashes/crises
- k. Bank crises, Stock exchange crashes, Industrial crises/relocation
- l. Refugee Problems
- m. Deliberate Human Actions
    - m1. Terrorism
    - m2. Political actions (outside the rules by which society is governed)
    - m3. Criminal Actions The invention can be characterized as "Technical Management Support" with automated process steps, based on a method with several comprised method steps. Dependent upon the scenario, more or fewer of the method steps can be used:

According to the main application A: Generation of information that increases the capability to understand and evaluate situations.
- a. Calculation of probabilities for different alternatives.
- b. Predictions of the development of situations based on probabilities.
- c. Descriptions of hypotheses, for example relating to intentions, reasons, strategies, objectives, action alternatives, choice of resources or activities, according to at least one adapted hypothesis model.
- d. Observations and information from other sources are compiled and adapted to an observation model that corresponds to the hypothesis model in order to be able to make comparative calculations.
- e. Probabilities are calculated for hypotheses (c) required for observations (d).
- f. Probabilities are calculated for observations (d) required for hypotheses (c).
- g. Information is generated based on probabilities for different situations.
- h. For a hypothesis (an activity) that is compiled from several sub-hypotheses (sub-activities), probabilities are calculated for success (Ps) for the sub-activity as well as for the total activity.
- i. An alarm is given in (h) for large deviations in Ps, for example if the probability (Ps) for a key activity is clearly less than 0.5.
- k. An alarm is given in (e) and (f) in the event of, for example, low probabilities (e) or changes greater than a threshold value (f).

According to the main application B: Generation of information that, increases the capability of evaluating the friendly-side action alternatives and understanding consequences.
- a. With method steps according to any of A: (a-k) above, the situation relating to the enemy's (adversary's) position and possibilities is evaluated.
- b. Friendly-side activities are described according to the hypothesis model (A:c)
- c. Resources are described with functions and capacities or corresponding capability-describing concepts, related to common references.
- d. Probability for success (Ps) is calculated taking into account the enemy's resources and evaluated situation.
- e. Ps is related to overweight in capability (capacity of function) according to a given probability distribution.
- f. Friendly-side action alternatives are evaluated according to (d and e).
- g. After evaluation of friendly-side action alternatives, "the perspective is inverted" and the enemy's action alternatives are evaluated provided that friendly-side activities are carried out.
- h. Interaction takes place between evaluation of friendly-side action alternatives and of the enemy's action alternatives and the probabilities of the consequences are calculated.

According to the main application C: Combining of (A) and (B) above in order to generate information about friendly-side actions relating to the development of the situation.
- a. With method steps according to any of A and B, friendly-side activities are carried out.

b. New observations are handled according to A:d, and the situation is developed dynamically.
c. Method steps according to A and B are carried out as a consequence of the dynamic development.
d. Results of probability calculations are updated. Old hypotheses can be rejected.
e. New hypotheses can be added and evaluated in a corresponding way to the old ones.
f. Friendly-side activities are planned or evaluated taking into account evaluation of the enemy's future reactions, the consequences of which can also be evaluated.

Firstly, the invention is described utilized on a selected example:

A foreign power (H) wants to site an operational base on another country's (O's) territory. The reason is that H feels threatened by a possible attack from a certain direction, and for geographical reasons has poor possibilities for achieving an effective defence within its own borders. The three alternative advance positions that were discussed on O's territory would give H great benefits. Negotiations have been commenced and H has promised advantageous trading conditions and alternatively made threats of reprisals.

O has said a definite "no" to all forms of foreign base on O's area. The situation between O and H is dangerous and critical.

O makes the following analysis regarding H's situation in a so-called "Need Chain":

1. What is H's Benefit/Cost ratio for the alternatives:
   A: Base at A.
   B: Base at B
   C: Base at C
   D: Other alternatives, including the peace alternative and H constructing the base on its own territory.
2. What is the probability, P( ), for H deciding to carry out the alternatives above, on the basis of Benefit/Cost, that is that the alternative with the greatest Benefit/Cost equals the greatest probability of taking that decision, etc. Assume the result:

$$P(A)=0.63, P(B)=0.19, P(C)=0.06, P(D)=0.12$$

3. A general evaluation of the probability for peace or risk of war is carried out, and an initial result Pi(peace)=90% and Pi(war)=10% is reached. This is based on the knowledge that was available before the analyses in points (1) and (2) above. New knowledge, (called K1) is obtained through the probability evaluation in point (2). A new probability Pr( ) is calculated on the basis of the new knowledge and the initial Pi( ).

On the basis of the information above (1)-(3), the following calculation steps are carried out:
a. The probability for any one of A, B or C is 0.88. This assumes that there will be war.

$$P(K1\backslash war)=0.88$$

The probability for D is 0.12. This assumes that there will continue to be peace.

$$P(K1\backslash peace)=0.12.$$

b. With the use of Bayes method, we obtain:

$$P(K1)=0.88*0.1+0.12*0.9=0.20$$

$$Pr(war\backslash K1)=P(K1\backslash war)*Pi(war)/P(K1)=0.88*0.1/0.20=0.44$$

$$Pr(peace\backslash K1)=P(K1\backslash peace)*Pi(peace)/P(K1)=0.12*0.9/0.20=0.56$$

c. Thus, the new probabilities for A, B, C according to the previous relationships become:

$$Pr(A)=0.32, Pr(B)=0.09, Pr(C)=0.03, Pr(D)=0.56$$

O notes H's activities according to evaluated strategies in order to achieve the alternatives A, B, C and D. A so-called "Strategy Chain" can comprise several steps, for example
Preparations (including any reconnaissance activities)
Resource gathering (resource-creating activities, etc)
Transportation of resources
Defence activities
Preparations for combat, battle, etc
Combat, battle, etc
Defence activities
Fortifications
Seizure, occupation, etc.

The above is an extended example of the traditional concepts: "Movement, Defence, Fire", that is used to illustrate military activity.

The steps in the Strategy Chain comprise activities (events E), that O can be expected to observe, that is O can obtain information about events E that increases O's knowledge concerning which of the alternatives A-D is the most probable.

Also here, the Bayes method can be used to calculate probabilities, for example the probability of A provided that the event E1 has occurred:

$$Pr(A\backslash E1)=P(E1\backslash A)*Pi(A)/P(E1); \qquad (e1)$$

Previously-calculated probabilities are now taken as Pi( ) in order to give a new Pr( ). The event E1 has a probability of occurring provided that A is true, that is P(E1\A) can be evaluated.

Later, a second event E2 can occur and a new probability Pr(A) can be calculated. The combined effect of E2 and E1 is taken into consideration in accordance with:

$$Pr(A\backslash E2,E1)=P(E2\backslash E1,A)*Pi(A\backslash E1)/P(E2\backslash E1); \qquad (e2)$$

Pi(A\E1) in (e2) corresponds to Pr(A\E1) in (e1). Indices r and i are added in order to simplify the development of P(A) in a series of new events.

It is also possible to use the combination of two events directly in (e1) in accordance with:

$$Pr(A\backslash E2,E1)=P(E2,E1\backslash A)*Pi(A)/P(E2,E1); \qquad (e3)$$

a. The new event E2 can include E1 as a sub-event, that is E2 can have a complex logical relationship to E1. This means that the evaluation of P(E2\E1,A)/P(E2\E1) can be difficult. Then, it is possible to go back a step in accordance with (e3) and apply (E2, E1) directly in accordance with (e1).
   In military operations, speed is vital. Therefore it can be good to increase knowledge quickly by processing E1 directly. When E2 occurs, (E2,E1) can be implemented in accordance with the above.
b. If E2 is logically independent of E1, then P(E2\E1, A) in (e2) is equal to P(E2\A) and (e2) is the natural calculation step (not the step in (a) above). If there were not a strong dependence between E2 and E1, P(E2\A) in (e2) would mean that "E1 is counted twice", that is that E1 would have too great an influence on the probabilities.
c. In the strategy chain, all the strategy steps are, of course, dependent upon the true strategy P("true"). However, the different steps can be logically independent in accordance with the method under consideration. By means of a matching design of the model for the different steps, events and observations will match the model better. Complex relationships can be avoided more easily and there is greater probability of having usable independent events in the strategy chain's processes.

In the strategy chain, key steps can be identified in the process, for example "Battle". This step can form a starting point for the analysis, and the resources that are required for battle are modelled. Then the planning "backwards" can give a matching of the earlier steps to the key steps' requirements, for example:

Which preparations need to be carried out and which resources are required.

Which resources are to be allocated and where they are to be located.

Which resources are required for transportation.

Which additional resources are judged to be needed for defence and preparations for battle.

In forward planning, the resources that are required for the subsequent steps are added. Such resources are defined specially that are required in early steps or that require early transportation.

Use of Functions, Capacities and Probability of Success.

The need for resources is to be related to the different tasks that are comprised in the Strategic Plan.

Functions are identified that have the capability to carry out the task.

The functions are to have sufficient capacity to cope with opposition to the carrying out of the task.

Uncertainties are usually associated with military operations. There is therefore no guarantee of success by using a given function with given capacity.

Probability for success, Ps, is introduced as a function for handling the reality of uncertainties in military actions.

Ps is related to a function and its capacity. By, for example, increasing the resources for a function's capacity, a higher probability for success (Ps) is usually obtained.

Probability for success (Ps) can be obtained by a comparison between actual (observed) capacities and the modelled need for capacities.

If the probability for success was Ps=0.5, this would mean the same probability for losing as for winning. If several independent functions have Ps=0.5, the combined probability is much lower and a loss is very probable.

A low Ps means low observed capacities. Accordingly, a low Ps can also mean a warning: "Look for more capacity (more resources)".

The matching or mismatching between reality and model is calculated using comparisons. The probability for the event (the observation) is dependent upon the respective hypothesis and is calculated from the said comparisons.

Probability Determinations of Events Depending Upon Different Strategy Alternatives.

The probabilities in (e2) above, for example $P(E2\backslash E1,A)$ and $P(E2\backslash A)$ are determined from the said comparisons above:

The larger the relative difference (dc) between reality and the model, the less the probability that the observed event (E2) is a consequence of (is dependent upon) for example A (or B or C or D).

The difference (dc) can be composed of a common part (s) and a noisy part (n). The part (s) can, for example, be dependent upon a difference in evaluation of military strengths, which can have a general effect on the different functions' capacities.

By integration of (dc), the different functions (s-parts and n-parts) can be added separately. From this, total $P(E2\backslash A)$ can be determined.

Alternatively, integrated terms can be compared, for example: The profile for the respective event and model can be compared using correlation and the conformity can be determined probabilistically and the deviation in the average capacity values can be determined probabilistically, and the two probability values can be combined to give a total probability value.

Another example illustrates the use of the method in a battle situation.

A vessel, armoured vehicle or aircraft observes a threat towards it. This can be attacking missiles that have been detected by radar, or detection of radiation from a hostile sighting radar or target tracker, or a laser that is directed towards the friendly-side unit for control of missiles. This can be torpedoes on the way, etc.

In the event of such a threat, time is short and people are not able to evaluate which countermeasures should be taken.

The threatened friendly-side unit has a given number of possible defence alternatives, for example;

Fire canons, employ missiles or anti-aircraft robots.

Interfere with missiles using electronic interference, for example radar interference, laser interference, etc.

Fight against torpedoes, or interfere with the firing.

Passive countermeasures such as radar strips, IR-"flares", water vapour, etc.

Other friendly-side units can be given an alarm (possibly automatically) and help to combat the threat with their weapons or countermeasures.

The method comprises several steps:

The threat is compared to previously modelled threats (function and capacity) and the probability for the enemy's success is determined by means of the comparison.

The threat can consist of several interacting hostile activities, for example several missiles, aircraft plus missiles, torpedo plus missiles, artillery plus interference, etc, that is threats in different combinations.

Defence alternatives are modelled as function and capacity and the probability for success of the defence alternatives is determined.

A choice of one or more defence alternatives is made depending upon the choice of probability for success of the defence.

The defence can consist of several interacting friendly-side activities, particularly in the event of several threats.

The threat is evaluated with regard to the seriousness and time available for combating it, for example a lesser threat that has the shortest time until its effect can be dealt with first, while a more serious threat, but with a larger time margin, can be dealt with later if, for example, the same defence alternative needs to be used.

Summary: The method determines the probability for a successful defence depending upon the threat situation, and selects defence alternatives on the basis of the said probability. The method can be carried out completely automatically or with a certain degree of input from an operator.

The method can be used in many different situations:

Guarding against the threat of terrorism: Selected possible threats, and alternative terrorist actions concerning these, containing particular characteristics, are modelled. Events are monitored by observations, and the method works with comparisons between events and the model. Such a monitoring can be carried out automatically and continue for a very long time. An alarm is given when the probability for terrorist action exceeds a selected value. The risk of false alarms is dealt with and refining characteristics are developed surreptitiously in order to achieve an increasingly better and more reliable system.

Tactical and combat-technical situations at different levels have corresponding components to those that have been illustrated above. These cases can be addressed by the method in a corresponding way.

In addition, a plurality of civil applications have similar components, for example natural disasters, forest fires, accidents involving aircraft, ships or road vehicles, threat of burglary, etc. Or more generally: Where there is uncertainty regarding how the situation will develop, and/or uncertainty regarding different alternative actions and their probability for success.

Here different alternative situations can be handled with probabilities for different outcomes, risks of different levels of damage, etc. Here probabilities for success for alternative actions can be related to threats or risks or other situation developments.

The method is particularly suitable when there is time pressure in the decision situation and/or when there are complex situations, for example characterized by being difficult to overview, by having many components or alternatives, actions that are difficult to prioritize, probabilities that are difficult to evaluate, etc.

The method can also be used with data communication, for example via the Internet, where there is a threat of "hacker"-penetration, or hostile activities. Here the threat environment can be modelled and uncertainty probabilities can be determined. Functions and capacities or corresponding concepts can be used for comparison between the model and actual events (observations). Friendly-side defence alternatives, their functions and capacities can be determined, and their probability for success. Alternatives can be prioritized, and choice of actions is made automatically or possibly with input from an operator.

Additional examples of embodiments are described briefly below in patent format.

A method for generating management support in management systems that receive information from sensors and other sources, process this information and supply information concerning actions, where the management support carries out all or parts of the management system's tasks, and supplies information to an operator and/or to external units for control of actions, and where the method is characterized by the following steps:
- a. adapting information from sensors and other sources to one or more selected observation models,
- b. selecting hypotheses relating to assumptions about an enemy's alternative activities or plans, which can give rise to observable events, and expressing the hypotheses in hypothesis models that are selected such that the information in the hypothesis model can be related to information in the said observation model, which information can, in turn, be related to the said observable events,
- c. carrying out probability calculations in accordance with any one of (c1)-(c5):
  - c1. developing a dynamic model of the situation with its starting point being first probability values for the respective selected hypothesis, calculating the probability for a first observed event, assuming the said selected hypothesis, and thereafter calculating a second probability for the said selected hypothesis, assuming the first observed event,
  - c2. and supplying the result of (c1), where the second probability for the said selected hypothesis is taken as the starting point for the calculation of the probability for a possibly occurring second observed event, after which a third probability for the said selected hypothesis can be calculated and, in a corresponding way, the situation model can be developed dynamically on the basis of further information from observable events and other sources,
  - c3. comparing the information in the said observation model, after the incorporation of information from the said first event, with the information in the said hypothesis model and calculating the probability for agreement between the pieces of information,
  - c4. and supplying the result of (c3), either concerning the whole of the information, concerning parts of the information, or concerning parts where information is lacking or has poor agreement,
  - c5. updating at least one of (c1)-(c4), in the event of any new events, that provide information to earlier observation models,
- d. supplying information from (c) to any one of (d1)-(d2):
  - d1. to an operator for further evaluation of the situation and/or any friendly-side actions,
  - d2. to the following method steps, that relate the result of (c) to alternative friendly-side actions and supplying the result of the said relationships to any one of (d3)-(d4):
    - d3. to an operator for further evaluation of actions,
    - d4. to external units for control of actions.

A method, in which obtained information is used for management of friendly-side actions and resources, characterized in that alternative hypotheses concerning possible actions by the enemy are selected and stored as hypothesis models in advance before the said actions of the enemy are expected to occur, and in that corresponding observation models are also prepared and in that the method includes automatic processes in the management support system in accordance with:
- e. information from observations related to sensors is obtained as electronic data that has been input into said management support system,
- f. the information is processed automatically, including the use of said hypothesis models and observation models in the management support system,
- g. the result is used as initial data from the management support system as claimed in (d4) above for automatic control of external units according to any one of:
  - c1. control of weapons
  - c2. control of countermeasures
  - c3. control of interference devices
  - c4. control of passive countermeasures
  - c5. control of reconnaissance units or sighting units
- h. (a), (b) and (c) is carried out as a fully-automatic process, or as an automatic process with optional input from an operator.

A method, characterized in that observations contain information that is used for generating hypotheses concerning an enemy's alternative plans including any one of possible, serious or critical actions by an enemy and where said actions can contain the sub-elements allocation of resources or movement of resources, and where
- i. the hypothesis model is based on an evaluation of what resources the enemy needs in order to carry out his action or said sub-element, and where the resources can be described as at least one of (a1)-(a6).
  - a1. type of resources
  - a2. quantity of respective type of resources
  - a3. functions that are required
  - a4. capacity that is required for the respective functions
  - a5. any special resource that is required in the form of type, unit, entity, aircraft, vessel, vehicle or other platform or fixed asset, a6. the capability to carry out the said objective or sub-element, on the basis of any one or more of (a1)-(a5)

j. the observation model corresponds to the hypothesis model, and the content of the observation model is based on information that is obtained from observations and other sources of information concerning the enemy's chosen resources and is described according to at least one of (b1)-(b6)

b1. type of resources
b2. quantity of respective type of resources
b3. functions
b4. capacity for the respective functions
b5. any special resource that has been observed in the form of type, unit, entity, aircraft, vessel, vehicle or other platform or fixed asset,
b6. capability to carry out the selected objective or sub-element, on the basis of any one or more of (b1)-(b5).

A method, characterized in that the enemy's actions contain the sub-element movement of resources or transportation of resources, and where the hypothesis model or the observation model includes direction of transportation or target of transportation for selected resources, and where any additional resources that are required or that are used in order to carry out the transportation are included.

A method, characterized in that the enemy's actions contain any one of the sub-elements combat, battle or initial deployment for battle, and where the hypothesis model or the observation model includes at least one of attack resources, defence resources and combat-technical deployment of resources.

A method, characterized in that the enemy's actions contain the sub-element reconnaissance or intelligence, and where the hypothesis model or the observation model includes reconnaissance resources.

A method, where obtained information is used for management of friendly-side actions and resources, characterized in that any one hypothesis indicates probability for an enemy's actions according to any one of:

k. certain types of resources are expected to appear within any one or more areas, and friendly-side actions are initiated according to at least one of (a1)-(a4):
  a1. friendly-side reconnaissance resources are deployed with effect against the said resources in the said areas,
  a2. combat with friendly-side resources is planned, where the probability for success is calculated taking into account friendly-side resources relative to the enemy's resources, and any other combat-technical circumstances,
  a3. the enemy's resources and combat-technical situation is calculated according to the hypothesis model with calculated probability, updated after observations have been received from friendly-side resources,
  a4. the enemy's reactions, as a result of friendly-side planned alternative actions, are evaluated using the hypothesis and observation models, and a new situation model relating to the future situation, after the said evaluated reactions, is obtained using the method's probability calculations.

The enemy's strategy, according to an alternative hypothesis concerning the enemy, contains activities that can be observed completely or partially or possibly concealed, and friendly-side actions can be planned aimed against said activities or against other targets in order to prevent or change the development of the situation according to the said strategy, and friendly-side actions are initiated according to at least one of (b1)-(b2):

b1. at least one alternative friendly-side action is planned and an evaluation of the result is carried out according to (a),
b2. in the event of more than one alternative in (b1), results according to (b1) of the said alternatives are compared, with the comparison including probability evaluations for the comprised alternatives, A method, in which hypothesis and observation models are based on functions and functions' capacity, or corresponding concepts, characterized in that the content of the observation model with capacity values (Co) is compared with the capacity values (Ch) of the hypothesis model in accordance with:

l. a probability distribution is selected, where the capacity values of the hypothesis model are selected to correspond to a particular level, so that if the enemy deploys resources with these capacities, then, according to the probability distribution, he has a probability $Ps(Ch)$ of succeeding with the activity or the function, m. the level of Ch can be selected, so that Ch stands for the capacity where the enemy is judged to have Ps=50% probability of succeeding, or Ch can be selected to be larger, to correspond to a level where, the enemy instead has Ps anywhere in the range 60-80% probability of succeeding, which can correspond to his natural selection of action superiority, or a different Ch level can be selected, related to the observation model, n. with the said probability distribution, a selected Ch1 level with associated $Ps(Ch1)$ can be related to other Ch2 values and their respective $Ps(Ch2)$, o. in a corresponding way, the capacities (Co) in the observation model can be related to the capacities (Ch) in the hypothesis model and $Ps(Co)$ can be related to $Ps(Ch)$ according to any one of (d1)-(d5):
  d1. if (Ch) is expected capacity and Co>Ch leads to $Ps(Co)>Ps(Ch)$, then the probability is larger than expected that the enemy will be successful,
  d2. if $Ps(Co)$ is much larger than $Ps(Ch)$, this can be an indication that the enemy intends some greater action or some other action than that represented by the hypothesis model,
  d3. if $Ps(Co)$ is less than or much less than $Ps(Ch)$, this can be an indication that friendly-side observations have not detected corresponding parts of the enemy's resources, and this can lead to an alarm and/or increased directed reconnaissance actions, or other friendly-side actions,
  d4. or if $Ps(Co)$ is less than or much less than $Ps(Ch)$, this can be an indication that the enemy has underestimated his requirements,
  d5. or if $Ps(Co)$ is less than or much less than $Ps(Ch)$, this can be an indication that the enemy intends some lesser action or some other action than that represented by the hypothesis model.

A method, where hypothesis models and observation models are managed using probability concepts based on one or more probability distributions, characterized by any one of (a)-(d) below:

p. the probability distribution is any one of:
  a1. Binomial distribution
  a2. Poisson distribution
  a3. Exponential distribution
  a4. Gamma distribution
  a5. Erlang distribution
  a6. Gaussian distribution
  a7. Rayleigh distribution
  a8. variants of, or combinations of (a1)-(a7)

q. the probability distribution is approximated by an adapted exponential distribution with the density function $$pe(x)=k1*\exp(-|(x-m)/m*k2|),$$

where k2 determines the gradient of the exponential function and k1 is a normalization constant, that gives the distribution function $Fez(x\to\infty)=1$, and is characterized by any one of (b1)-(b4):
  b1. pe(x) has a maximum value for x=m, while the actual average value me is larger than m, in accordance with me=k3*m,
  b2. and $Ps=P(z<x=mh)=Fez(x=mh)=0.5$ for x=mh, where $mh=(k3)^{0.5}*m$,
  b3. and if x is exemplified by the capacity for a function, Ps=0.5 is obtained for x=mh, where mh is larger than m,
  b4. and pe is an example of a skewed density function, in a corresponding way to Poisson, Gamma and Erlang functions, while the Gaussian distribution is symmetrical.

The invention claimed is:

1. A method in electronic systems for automatic detection in military command applications, where the detection regards an opponent's (Red's) possible intention to launch a harmful attack against own (Blue's) interests, and where the method creates an early detection by Blue of the said Red's intention, whereby a time margin is created for Blue's preparation before the intended attack is realised, and where the method handles uncertainties about an opponent's or other parties' intentions and courses of actions by probability measures, and where the detection process of the said intentions or courses of actions is using a selection of physical objects' capability oriented parameters, and where the present said method includes complex operations, and the said method being further characterised by the following method steps:
  detecting the said intentions or courses of actions by an indirect detection process based on detection of a selection of physical objects' capability oriented parameters, further comprising:
  a. structuring the said detection process in a top-down objective oriented process, called "objop" and an observation oriented process called "obsop",
  a1. where objop is based on estimations on Red's selected needs or operational partial or end goals, and comprises (b)-(d),
  b. selecting at least one of the said physical objects' capability oriented parameters from the parameter group of capability, functional capacity and resource for contributing in the process of possibly achieving said operational partial or end goals, according to at least one of (b1)-(b3);
  b1. selecting capabilities,
  b1.1 selectively transforming capabilities to functions with selected capacities or to selected resources,
  b2. selecting functions with selected capacities,
  b2.1 selectively transforming functions with selected capacities to selected resources,
  b3. selecting resources,
  c. quantifying into selected units at least one of the parameters in the parameter group of (b)
  d. selectively using the said quantities of parameters for estimating contributions in achieving the said operational partial or end goals,
  e. where obsop is based on observations on the developed situation, including observations on at least one of (e1) and (e2), and where (e) is corresponding to (a1) and (b) through the obsop and objop relations further used in (f)-(i) below,
  e1. observations on at least one of: achieved partial or end results, or obtaining said achieved partial or end results by transformation from observations on at least one of capabilities or function capacities or resources,
  e2. observations on at least one of: capabilities, functions with capacities and resources, or obtaining said capabilities or functions with capacities by transformation from observations on resources,
  e3. and where obsop is based on at least one of the following sources of information: sensors with sensor information, other sources with information derived from sensors and stored information related to (e1) or (e2) above from various file systems, various network-connected computer-based sources or from network-based sources of Internet-like types of systems,
  f. selectively transforming obtained information from any of (e)-(e2) to at least one of the parameters from the said parameter group, and selecting the corresponding quantity unit as in (c)
  g. selecting corresponding parameters from the objop process (c) and the obsop process (f), and
  h. comparing the said corresponding parameters regarding types and quantities, and
  i. estimating the detection probability, based on the observation (f), for at least one of: the objop parameter in (g), the said objop based needs and operational partial or end goals.

2. A method in electronic systems for automated detection in military command applications, where the detection regards own (Blue's) probability to realize own goals against an opponent's (Red's) possible courses of actions against own (Blue's) interests, and where the command application regards early detection, creating a time margin mainly before the situation would be developed that far that Red has launched a selected intended harmful action, included in his said courses of actions, and also early in order for Blue to prepare for or to prevent or change the said development of the situation, selectively including preventing or avoiding Red's said intended launch of the harmful action, and where uncertainties about the ability to realize Blue's own goals are related to the opponent's alternatives of courses of actions and corresponding capabilities and is handled by using probability measures, and where the said detection process of the probability to realize own goals is using a selection of physical objects' capability oriented parameters, and includes detection of the opponent's said courses of actions and capabilities, and where Red's said capabilities correspond to a basis level, and where a probability to realise an own goal is related to an own overweight in capabilities, representing the goal level, and where the gap between the corresponding basis level and the goal level is a corresponding measure on a need for further capabilities, which capabilities are considered to be effected by own forces and then contributing in achieving the said goal with the said related probability, and where said uncertainties about obtaining the own goal include at least one of: the uncertainties about an opponent's and possibly other parties' situation, their capabilities, their actions, their preferences on actions and the outcome of own planned actions, and where the present said method includes complex operations, and the said method being further characterised by the following method steps:

detecting own (Blue's) probability to realize own goals by an indirect detection process based on detection of a selection of physical objects' capability oriented parameters, further comprising:
a. structuring the detection process in a top-down objective oriented process, called "objop" and an observation-oriented process called "obsop",
a1. where objop is based on selected needs or operational partial or end goals for own efforts, and comprises (b)-(e) below:
b. planning or estimating or predicting own efforts by including considerations on at least one of: the opponent situation, capabilities and preferences on possible actions, or alternatively by including considerations according to claim 1,
c. selecting at least one of the said physical objects' capability oriented parameters from the parameter group of capability, functional capacity and resource for contributing in the process of possibly achieving said operational partial or end goals, according to at least one of (c1)-(c3);
c1. selecting capabilities,
c1.1 selectively transforming capabilities to functions with selected capacities or to selected resources,
c2. selecting functions with selected capacities,
c2.1 selectively transforming functions with selected capacities to selected resources,
c3. selecting resources,
d. quantifying into selected units at least one of the parameters in the parameter group of (b)
e. selectively using the said quantities of parameters for estimating contributions in achieving the said operational partial or end goals,
f. where obsop is based on observations on the developed situation, including observations on at least one of (f1) and (f2), and where (f) is corresponding to (a1)-(c) through the obsop and objop relations further used in (g)-(j) below,
f1. observations on at least one of: achieved partial or end results, or obtaining said achieved partial or end results by transformation from observations on at least one of capabilities or function capacities or resources,
f2. observations on at least one of: capabilities, functions with capacities and resources, or obtaining said capabilities or functions with capacities by transformation from observations on resources,
f3. and where obsop is based on at least one of the following sources of information: sensors with sensor information, other sources with information derived from sensors and stored information related to (f1) or (f2) above from various file systems, various network-connected computer-based sources or from network-based sources of Internet-like types of systems,
g. selectively transforming obtained information from any of (f)-(f3) to at least one of the parameters from the said parameter group, and selecting the corresponding quantity unit as in (d)
h. selecting corresponding parameters from the objop process (d) and the obsop process (g), and
i. comparing the said corresponding parameters regarding types and quantities, and
j. estimating the detection probability, based on the observation (g), for at least one of: the objop parameter in (h), the said objop based needs and operational partial or end goals.

3. The method according to claim 1 in electronic systems for automatic detection in management applications of public or private organisations (instead of military applications), where the problems are caused by organised human actions (and where examples include terrorism, political actions and criminal actions), and where the force of the said problem is taking the part of the opponent.

4. The method according to claim 2 in electronic systems for automatic detection in management applications of public or private organisations (instead of military applications), where the problem area is at least one of natural disasters, accidents, technical faults and human factors (and where examples include: fires, flooding, problems of transport, power, tele- and data-communication, pollutions, chemicals, illness, economy crisis), and where the force of the said problem area is taking the part of the opponent.

5. The method according to claim 2, further comprising:
a. using preregistered objop, stored as electronic data,
b. using obsop information related to sensors as electronic data,
c. automatically detecting opponent's threat
d. automatically detecting own probability of success according to result of (c),
e. automatically generating control actions according to result of (d),
f. performing control actions according to at least one of (g)-(h),
g. automatic control of one of (g1)-(g5),
g1. control of weapons
g2. control of countermeasures
g3. control of interference devices
g4. control of passive countermeasures
g5. control of reconnaissance units or sighting units
h. generating orders according to (f).

6. The method according to claim 2, further comprising: at least one of (a) and (b):
a. detecting an opponent's or other parties' intentions or causes of actions, using the probability measures,
b. detecting the probabilities of success in obtaining the own goals.

7. The method according to claim 1, further comprising:
estimating probabilities for a selected number of uncertainties in the said process steps of objop and obsop, and
using said probabilities for at least one of:
a. contributing in the estimation of the said detection probabilities,
b. comparing said probabilities between selected steps and alternatives included in the said detection process,
c. identifying those of the said selected uncertainties, which have a selected characteristic, selected from the group; having low or high probability, being most or least uncertain, being related to large threat or key actions.

8. The method according to claim 1, wherein objop can be reached in a number of alternative ways, and claim 1 (b-d) or claim 2 (b-e) be performed for selected ones of said alternative ways, comprising the following method steps:
using the results of claim 1 (e-i) or claim 2 (f-j) for said selected alternatives, and using the probability measures for detection and indication of the probability situation for the respective selected alternative, based on the observations.

9. The method according to claim 2, wherein a number of alternative objectives is selected, each alternative being based on a different set of needs or operational partial or end goals, comprising the following method steps:
using the results of claim 1: (a-i) or claim 2: (a-j) for said selected objective alternatives, and using the probability measures for detection and indication of the probability situation for the respective selected objective alternative, based on the observations.

10. The method according to claim 2, wherein the probability of success in obtaining the own goals is detected, comprising the following method steps:
planning own efforts and predicting the outcome by including the opponent's intention or alternative causes of actions and predictions of the corresponding actions,
using probability measures for the uncertainties in the said detection process.

11. The method according to claim 2, wherein the detection process can be divided into planning processes and execution processes, and where the method in the planning process is considering the involved parties' situation in the development of a plan for the own force organisation, comprising the following method steps:
  a. estimating the gap between a goal level and a base level, where the goal level is a partial goal level or the end-goal level, and the base level is an earlier achieved level or the start level,
  b. estimating the probabilities for at least one of (b1)-(b6)
  b1. the probability for achieving the said goal from the said base level in (a)
  b2. the probability in (b1), when the knowledge is developed by considering selected actions with selected resources for achieving the capabilities needed in (b1)
  b3. the respective probability for success of performance for a number of alternative actions with resources, selectively used in (b2),
  b4. the probability in (b1), when the goal is the end-goal and the base level is the start level,
  b5. estimating (b4) successively at various stages of developed knowledge, including at least one of: considering a number of intermediate goal- and base-levels and considering a number of corresponding selected actions with selected resources,
  b6. selectively comparing possible variations of the probability values for a number of the alternative said stages in (b5), and relating the said variations to corresponding variations in the developed knowledge.

12. The method according to claim 2, wherein the detection process can be divided into planning processes and execution processes, and where the method in the planning process is considering the involved parties' situation and efforts, and the development of the plan for the own force organisation comprises the following method steps:
  a. developing knowledge by stages,
  a1. where a first stage includes estimating probability measures P1(goal) for achieving the said goal level, based on the knowledge (k1),
  a2. where a second stage includes developing the knowledge into more details, by selectively dividing the gap into intermediate gaps between goal and base levels and/or introducing knowledge about capabilities or functions with selected capacities or selected actions with selected resources, and
  b. estimating new probability measures P2(goal\k2) for the goal in (a1) after the new package of knowledge (k2) in (a2) by one of (b1)-(b2),
  b1. where P2(goal\k2) is estimated as P2(goal) replacing P1(goal) by considering (k2) and (k1) together,
  b2. where P2(goal\k2) is estimated by using the algorithm:

$P2(goal\backslash k2) = P(k2\backslash goal) * P1(goal)/P(k2)$, where $P(k2) = P(k2\backslash goal) * P(goal) + P(k2\backslash \text{not-goal}) * P(\text{not-goal})$ and P(k2\goal) is the probability that (k2) is true if (goal) is true,
  c. selectively repeating the steps (a2) and (b) for further stages.

13. The method according to claim 12, further comprising:
  a. updating of probabilities of applicable parameters, dependent on new information/knowledge from observations or through other information channels by at least one of (b)-(c),
  b. repeating the corresponding process steps in obsop of claims (1-2) for the new information/knowledge situation,
  c. using the method steps of claim 12: (b-b2) more generally, where (k2) is the new information/knowledge and (k1) the old, and (goal) is replaced with the said applicable parameter, (which might be the goal).

14. Method according to claim 2, wherein the uncertainty regarding goals, capabilities, function capacities or action resources are handled by using probability measures, and where the said uncertainty is regarded within a range, and where the said uncertainty range is related to standard probability measures as standard deviation and mean/average value, and where the said uncertainty range is related to the said standard deviation around the said mean/average value, and where the probability estimations further comprises:
  a. selecting a number of variable parameters for estimations of three values on the respective parameter: the most probable value, the highest value and the lowest value, where the variations of the parameter values correspond to the uncertainty region, and
  b. estimating the respective average value and standard deviation for the parameters in (a), using selected probability density or distribution functions as models.

15. The method as claimed in claim 1, for generating management functions in a management system that obtains information from sensors and other sources, processes this information and supplies information relating to actions, where the management support carries out all or parts of the management system's tasks (a1)-(d) below, and provides information to an operator and/or to external units for control of actions, and where the method further comprises:
  a1. enters information structured for the detection process according to objop or obsop,
  a2. adapts information from sensors and other sources to one or more selected observation models,
  b. selects hypotheses relating to entered assumptions concerning an opponent's alternative activities or plans which can give rise to observable events, and expresses the hypotheses in hypothesis models, that are selected such that the information in the hypothesis models can be related to information in the said observation models, which information can, in turn, be related to the said observable events,
  c. carries out probability calculations according to any one of (c1) and (c2) below:
  c1. develops a dynamic situation model with starting point in first probability values for the respective selected hypothesis, calculates the probability for a first observed event, assuming said selected hypothesis, and thereafter calculates a second probability for said selected hypothesis, assuming the first observed event,
  and selectively uses the result from (c1 above), where the second probability for said selected hypothesis is included as starting point for the calculation of the probability for any second observed event that has occurred, after which a third probability for said selected hypothesis can be calculated and, in a corresponding way, situation models can be developed dynamically on the basis of further information from observable events and other sources, c2. compares the information in the said observation model, after the incorporation of information from the said first event, with the information in the said hypothesis model and calculates the probability for a hypothesis in the said hypothesis model being true on the basis of the information in the said observation model, and selectively uses the result of (c2 above), for either all of the information in the observation model, parts of it, or parts where information is lacking or has poor agreement, c3. if required, updates at least one of (c1) and (c2), in the event of any new events that provide information to earlier observation models, d. supplies information from (c) to any one of (d1)-(d2):

d1. to an operator for further evaluation of the situation and/or any friendly-side actions, d2. to following method steps, that relate the result of (c) to alternative friendly-side actions and supply the result of said relationships to any one of (d3)-(d4):

d3. to an operator for further evaluation of actions, d4. to external units for control of actions.

16. The method according to claim 1, wherein observations contain information that is used for the generation of hypotheses concerning an opponent's alternative plans including any one of possible, serious or critical opponent's actions and where said actions can contain the sub-element allocation of resources or movement of resources, and where a. the hypothesis model is based on an evaluation of what resources the enemy needs in order to carry out his action or said sub-element, and where the resources can be described as at least one of (a1)-(a6):

a1. type of resources a2. quantity of respective type of resources a3. functions that are required a4. capacity that is required for the respective functions a5. any one particular resource that is required from among the following: type, unit, entity, aircraft, vessel, vehicle or other platform or fixed asset, a6. the capability to carry out said objective or sub-element, on the basis of any one or more of (a1)-(a5)

b. the observation model corresponds to the hypothesis model, and the content of the observation model is based on information that is obtained from observations and other sources of information concerning the enemy's selected resources and is described according to at least one of (b1)-(b6)

b1. type of resources b2. quantity of respective type of resources b3. functions b4. capacity for respective function b5. any one particular resource that was observed from among the following:

type, unit, entity, aircraft, vessel, vehicle or other platform or fixed asset, b6. capability to carry out the selected objective or sub-element, on the basis of any one or more of (b1)-(b5).

17. The method according to claim 1, wherein the opponent's actions contain at least one of (a)-(c), a. the sub-element movement or transportation of resources, and where the hypothesis model and the observation model respectively includes the direction of transportation or target of transportation for selected resources, and where any additional resources that are required or that are used in order to carry out the transportation are included, b. any one of the sub-elements combat, battle or initial deployment for battle, and where the hypothesis model and the observation model respectively includes at least one of attack resources, defence resources and combat-technical deployment of resources, c. the sub-element reconnaissance or intelligence, and where the hypothesis model and the observation model respectively includes reconnaissance resources.

18. The method according to claim 1, wherein obtained information is used for management of friendly-side actions and resources, characterized in that any one hypothesis indicates probability for an opponent's actions according to any one of:

a. certain types of resources are expected to appear within any one or more areas, and friendly-side actions are initiated according to at least one of (a1)-(a4):

a1. friendly-side reconnaissance resources are deployed with effect against the said resources in the said areas, a2. combat utilizing friendly-side resources is planned, where the probability for success is calculated taking into account friendly-side resources relative to the opponent's resources, and any other combat-technical circumstances, a3. the opponent's resources and combat-technical situation are calculated according to the hypothesis model with calculated probability, updated after observations have been received from friendly-side resources, a4. the opponent's reactions, as a result of friendly-side planned alternative actions, are evaluated using the hypothesis and observation models, and a new situation model, relating to the future situation after the said evaluated reactions, is obtained using the method's probability calculations, b. the opponent's strategy, according to an alternative hypothesis concerning the opponent, contains activities that can be observed completely or partially or possibly concealed, and friendly-side actions can be planned directed against said activities or against other targets in order to prevent or change the development of the situation according to the said strategy, and friendly-side actions are initiated according to at least one of (b1)-(b2):

b1. at least one alternative friendly-side action is planned and an evaluation of the result is carried out according to (a), b2. in the event of more than one alternative in (b1), results according to (b1) of the said alternatives are compared, with the comparison including probability evaluations for the comprised alternatives.

19. The method according to claim 1, where hypothesis and observation models are based on functions and functions' capacity, or corresponding concepts, characterized in that the content of the observation model with capacity values (Co) is compared with the capacity values (Ch) of the hypothesis model in accordance with:

a. a probability distribution is selected, where the capacity values of the hypothesis model are selected to correspond to a particular level, so that if the opponent deploys resources with these capacities, then, according to the probability distribution, he has a probability $Ps(Ch)$ of succeeding with the activity or the function, b. the level of Ch can be selected, so that Ch stands for the capacity where the opponent is judged to have Ps=50% probability of succeeding, or Ch can be selected to be larger, to correspond to a level where the opponent instead has Ps anywhere in the range 60-80% probability of succeeding, which can correspond to his natural selection of action superiority, or a different Ch level can be selected, related to the observation model, c. with the said probability distribution, a selected Ch1 level with associated Ps(Ch1) can be related to other Ch2 values and their respective Ps(Ch2), d. in a corresponding way, the capacities (Co) in the observation model can be related to the capacities (Ch) in the hypothesis model and Ps(Co) can be related to Ps(Ch) according to any one of (d1)-(d5):

d1. if (Ch) is expected capacity and Co>Ch leads to Ps(Co) >Ps(Ch), then the probability is larger than expected that the opponent will be successful, d2. if Ps(Co) is much larger than Ps(Ch), this can be an indication that the opponent intends some greater action or some other action than that represented by the hypothesis model, d3. if Ps(Co) is less than or much less than Ps(Ch), this can be an indication that friendly-side observations have not detected corresponding parts of the opponent's resources, and this can lead to an alarm and/or increased directed reconnaissance actions, or other friendly-side actions, d4. or if Ps(Co) is less than or much less than Ps(Ch), this can be an indication that the opponent has underestimated his requirements, d5. or if Ps(Co) is less than or much less than Ps(Ch), this can be an indication that the opponent intends some lesser action or some other action than that represented by the hypothesis model.

20. The method according to claim 1, wherein hypothesis models and observation models are managed with probability concepts based on one or more probability distributions, characterized by any one of (a)-(d) below:

a. the probability distribution is any one of:
a1. Binomial distribution
a2. Poisson distribution
a3. Exponential distribution
a4. Gamma distribution
a5. Erlang distribution
a6. Gaussian distribution
a7. Rayleigh distribution
a8. variants of, or combinations of (a1)-(a7)

b. the probability distribution is approximated by an adapted exponential distribution with the density function $$pe(x)=k1*\exp(-|(x-m)/m*k2|),$$

where k2 determines the gradient of the exponential function and k1 is a normalization constant, that gives the distribution function $Fez(x\to\infty)=1$, and is characterized by any one of (b1)-(b4):

b1. pe(x) has a maximum value for x=m, while the actual average value me is larger than m, in accordance with me=k3*m, b2. and Ps=P(z<x=mh)=Fez(x=mh)=0.5 for x=mh, where mh=$(k3)^{0.5}$*m, b3. and if x is exemplified by the capacity for a function, Ps=0.5 is obtained for x=mh, where mh is larger than m, b4. and pe is an example of a skewed density function, in a corresponding way to Poisson, Gamma and Erlang functions, while the Gaussian distribution is symmetrical.

21. The method according to claim 1, wherein conflicting parties, named Blue (own) and Red (opponent), are uncertain about each other's intentions, characterized in that the probability estimations by Blue include at least one of (a)-(d), a. the probability of the starting conditions for the systems of interest in the said conflict, b. the probability of Red's selection of preferred actions for reaching an outcome state of conditions for the said systems with positive benefit/cost or utility for Red, c. the probability for Blue to reach his goal of benefit, by Blue's decision on selection of Blue's actions for reaching an outcome state of conditions for the said systems with said benefit goal for Blue, d. the probability in (c) when Blue's decision also includes the conditions and probabilities of (a) and/or (b).

22. The method according to claim 1, wherein in the carrying out of the method, an operator interacts with the electronic system by inputting information according to at least one of (a)-(c)

a. in at least one of the method steps in claims (1)-(2), b. using an input tool that structures the information, and where structure and terms are adapted for selected applications, c. using the operator's operational concepts and terms, and in that a recoding is thereafter carried out to terms that match the further method steps according to previous claims.

23. An arrangement in electronic systems for automatic detection in military command applications, where the detection regards an opponent's (Red's) possible intention to launch a harmful attack against own (Blue's) interests, and where the method creates an early detection by Blue of the said Red's intention, whereby a time margin is created for Blue's preparation before the intended attack is realised, and where the method handles uncertainties about an opponent's or other parties' intentions and courses of actions by probability measures, and where the detection process of the said intentions or courses of actions is using a selection of physical objects' capability oriented parameters, and where the present said method includes complex operations, and the said arrangement being further characterised in that means are arranged for carrying out:

detecting the said intentions or courses of actions by an indirect detection process based on detection of a selection of physical objects' capability oriented parameters, further comprising:

a. structuring the said detection process in a top-down objective oriented process, called "objop" and an observation oriented process called "obsop", a1. where objop is based on estimations on Red's selected needs or operational partial or end goals, and comprises (b)-(d), b. selecting at least one of the said physical objects' capability oriented parameters from the parameter group of capability, functional capacity and resource for contributing in the process of possibly achieving said operational partial or end goals, according to at least one of (b1)-(b3):

b1. selecting capabilities,
b1.1 selectively transforming capabilities to functions with selected capacities or to selected resources,
b2. selecting functions with selected capacities,
b2.1 selectively transforming functions with selected capacities to selected resources,
b3. selecting resources, c. quantifying into selected units at least one of the parameters in the parameter group of (b)

d. selectively using the said quantities of parameters for estimating contributions in achieving the said operational partial or end goals,
e. where obsop is based on observations on the developed situation, including observations on at least one of (e1) and (e2), and where (e) is corresponding to (a1) and (b) through the obsop and objop relations further used in (f)-(i) below,
e1. observations on at least one of: achieved partial or end results, or obtaining said achieved partial or end results by transformation from observations on at least one of capabilities or function capacities or resources,
e2. observations on at least one of: capabilities, functions with capacities and resources, or obtaining said capabilities or functions with capacities by transformation from observations on resources,
e3. and where obsop is based on at least one of the following sources of information: sensors with sensor information, other sources with information derived from sensors and stored information related to (e1) or (e2) above from various file systems, various network-connected computer-based sources or from network-based sources of Internet-like types of systems,
f. selectively transforming obtained information from any of (e)-(e2) to at least one of the parameters from the said parameter group, and selecting the corresponding quantity unit as in (c)
g. selecting corresponding parameters from the objop process (c) and the obsop process (f), and
h. comparing the said corresponding parameters regarding types and quantities, and
i. estimating the detection probability, based on the observation (f), for at least one of: the objop parameter in (g), the said objop based needs and operational partial or end goals.

24. An arrangement in electronic systems for automated detection in military command applications, where the detection regards own (Blue's) probability to realize own goals against an opponent's (Red's) possible courses of actions against own (Blue's) interests, and where the command application regards early detection, creating a time margin mainly before the situation would be developed that far that Red has launched a selected intended harmful action, included in his said courses of actions, and also early in order for Blue to prepare for or to prevent or change the said development of the situation, selectively including preventing or avoiding Red's said intended launch of the harmful action, and where uncertainties about the ability to realize Blue's own goals are related to the opponent's alternatives of courses of actions and corresponding capabilities and is handled by using probability measures, and where the said detection process of the probability to realize own goals is using a selection of physical objects' capability oriented parameters, and includes detection of the opponent's said courses of actions and capabilities, and where Red's said capabilities correspond to a basis level, and where a probability to realise an own goal is related to an own overweight in capabilities, representing the goal level, and where the gap between the corresponding basis level and the goal level is a corresponding measure on a need for further capabilities, which capabilities are considered to be effected by own forces and then contributing in achieving the said goal with the said related probability, and where said uncertainties about obtaining the own goal include at least one of: the uncertainties about an opponent's and possibly other parties' situation, their capabilities, their actions, their preferences on actions and the outcome of own planned actions, and where the present said method includes complex operations, and the said arrangement being further characterised in that means are arranged for carrying out:

detecting own (Blue's) probability to realize own goals by an indirect detection process based on detection of a selection of physical objects' capability oriented parameters, further comprising:
a. structuring the detection process in a top-down objective oriented process, called "objop" and an observation-oriented process called "obsop",
a1. where objop is based on selected needs or operational partial or end goals for own efforts, and comprises (b)-(e) below:
b. planning or estimating or predicting own efforts by including considerations on at least one of: the opponent situation, capabilities and preferences on possible actions, or alternatively by including considerations according to claim 1,
c. selecting at least one of the said physical objects' capability oriented parameters from the parameter group of capability, functional capacity and resource for contributing in the process of possibly achieving said operational partial or end goals, according to at least one of (c1)-(c3):
c1. selecting capabilities,
c1.1 selectively transforming capabilities to functions with selected capacities or to selected resources,
c2. selecting functions with selected capacities,
c2.1 selectively transforming functions with selected capacities to selected resources,
c3. selecting resources,
d. quantifying into selected units at least one of the parameters in the parameter group of (b)
e. selectively using the said quantities of parameters for estimating contributions in achieving the said operational partial or end goals,
f. where obsop is based on observations on the developed situation, including observations on at least one of (f1) and (f2), and where (f) is corresponding to (a1)-(c) through the obsop and objop relations further used in (g)-(j) below,
f1. observations on at least one of: achieved partial or end results, or obtaining said achieved partial or end results by transformation from observations on at least one of capabilities or function capacities or resources,
f2. observations on at least one of capabilities, functions with capacities and resources, or obtaining said capabilities or functions with capacities by transformation from observations on resources,
f3. and where obsop is based on at least one of the following sources of information: sensors with sensor information, other sources with information derived from sensors and stored information related to (f1) or (f2) above from various file systems, various network-connected computer-based sources or from network-based sources of Internet-like types of systems,
g. selectively transforming obtained information from any of (f)-(f3) to at least one of the parameters from the said parameter group, and selecting the corresponding quantity unit as in (d)
h. selecting corresponding parameters from the objop process (d) and the obsop process (g), and
i. comparing the said corresponding parameters regarding types and quantities, and j. estimating the detection probability, based on the observation (g), for at least one of: the objop parameter in (h), the said objop based needs and operational partial or end goals.

25. The arrangement according to claim 23, further comprising; means for carrying out applications.

26. The arrangement according to claim 23, wherein the arrangement contains input means, display means and processing means, and where the processing means,
   a. contains an interface to the respective input means and display means, and
   a1. where the interface to the input means contains tools for inputting information in a structured way,
   b. contains a computer unit with calculation capability and memory capability for processing information according to claim 3.

27. The arrangement according to claim 23, wherein the arrangement contains means for information searching and data communication and processing means, and where the processing means,
   a. contains an interface to the respective information searching and data communication for transferring information, and
   a1. where the interface to information searching contains means for generating search processes over a data network, and
   a2. where the interface to data communication for the transmission of information contains means for communication of results and inputting externally over a network to external electronic systems,
   b. contains a computer unit with calculation capability and memory capability for processing information according to claim 3.

* * * * *